(12) United States Patent
Moore

(10) Patent No.: US 6,459,200 B1
(45) Date of Patent: Oct. 1, 2002

(54) REFLECTIVE ELECTRO-OPTIC FIBER-BASED DISPLAYS

(76) Inventor: Chad Byron Moore, 7 W. 4$^{th}$ St., Corning, NY (US) 14830

(*) Notice: Subject to any disclaimer, the term of this patent is extended or adjusted under 35 U.S.C. 154(b) by 0 days.

(21) Appl. No.: 09/517,759

(22) Filed: Mar. 2, 2000

Related U.S. Application Data

(63) Continuation-in-part of application No. 09/299,372, filed on Apr. 26, 1999, which is a continuation-in-part of application No. 08/810,960, filed on Feb. 27, 1997, now Pat. No. 5,984,747.

(51) Int. Cl.$^7$ ................................................ H01J 17/49
(52) U.S. Cl. ........................ 313/582; 313/113; 313/586
(58) Field of Search ............................... 313/582, 583, 313/584, 585, 586, 587, 113; 345/37, 41, 60

(56) References Cited

U.S. PATENT DOCUMENTS

| | | | |
|---|---|---|---|
| 2,209,747 A | 7/1940 | Eisler | 178/6.5 |
| 3,521,941 A | 7/1970 | Deb et al. | 350/160 |
| 3,668,106 A | 6/1972 | Ota | 204/299 |
| 3,767,392 A | 10/1973 | Ota | 96/1 |
| 3,964,050 A | 6/1976 | Mayer | 340/324 |
| 4,027,188 A | 5/1977 | Bergman | 313/220 |
| 4,038,577 A | 7/1977 | Bode et al. | 313/188 |
| 4,126,854 A | 11/1978 | Sheridon | 340/373 |
| 4,143,103 A | 3/1979 | Sheridon | 264/4 |
| 4,261,653 A | 4/1981 | Goodrich | 350/362 |
| 4,438,160 A | 3/1984 | Ishikawa et al. | 427/214 |
| 4,554,537 A | 11/1985 | Dick | 340/775 |
| 4,717,949 A | 1/1988 | Eichenlaub | 358/3 |
| 4,728,864 A | 3/1988 | Dick | 315/169.3 |
| 4,833,463 A | 5/1989 | Dick et al. | 340/775 |
| 4,896,149 A | 1/1990 | Buzak et al. | 340/794 |

(List continued on next page.)

FOREIGN PATENT DOCUMENTS

| | | | |
|---|---|---|---|
| EP | 0 884 619 A2 | 12/1998 | G02F/1/133 |
| JP | 10149763 | 2/1998 | H01J/9/02 |
| JP | 11003649 | 6/1999 | H01J/9/02 |

OTHER PUBLICATIONS

"Microsheets for (Reflective) Plasma–Addresses Displays (PALC)." Research Disclosure, Kenneth Mason Publications, Hampshire, GB, No. 416, Dec. 1998 (1998–12) page.

Dick, G. W. "Three–Electrode per PEL AC Plasma Display Panel", 1985 International Display Research Conf., pp 45–50.

Storm, R., 1974, "32–Inch Graphic Plasma Display Module", SID Int. Symposium, San Diego, pp 122–123.

Moore, C. et al, "Fiber Plasma Display", SID '97 Digest, pp. 1055–1058.

Trotter, D. M. et al, "PALC Displays Made From Electroded Glass Fiber Arrays", SID '97 Digest, pp. 379–382.

Weber et al, 1996, "Materials and Manufacturing Issues of Color Plasma Displays", MRS Bulletin, 65, 1996.

Mikoshiba, Shigeo, SID Int. Symp. Seminar Lectaure Notes, M–4, 1998.

*Primary Examiner*—Ashok Patel
*Assistant Examiner*—Thelma Sheree Clove
(74) *Attorney, Agent, or Firm*—Brown & Michaels PC

(57) ABSTRACT

A reflective display is formed using two orthogonal fiber arrays and an electro-optic material. The bottom fibers contain plasma channels, used to address the electro-optic material. Wire electrodes built into the fibers address both the plasma and the electro-optic material. The fibers are composed of glass, plastic or a combination of glass and plastic. Color is imparted into the display using colored fibers, adding a color coating to the surface of the fibers, or adding the color to the electro-optic material. The electro-optic material consists of a liquid crystal material, electrophoretic material, bichromal sphere material, electrochromic material, or any electro-optic material that can serve to create a reflective display.

48 Claims, 21 Drawing Sheets

U.S. PATENT DOCUMENTS

| | | | |
|---|---|---|---|
| 5,036,317 A | 7/1991 | Buzak | 340/783 |
| 5,077,553 A | 12/1991 | Buzak | 340/794 |
| 5,086,297 A | 2/1992 | Mjyake et al. | 340/759 |
| 5,272,472 A | 12/1993 | Buzak | 345/60 |
| 5,313,423 A | 5/1994 | Sato et al. | 365/200 |
| 5,440,201 A | 8/1995 | Martin | 313/582 |
| 5,446,344 A | 8/1995 | Kanazawa | 315/169.4 |
| 5,457,574 A | 10/1995 | Eichenlaub | 359/619 |
| 5,661,500 A | 8/1997 | Shinoda et al. | 345/60 |
| 5,674,553 A | 10/1997 | Shinoda et al. | 427/68 |
| 5,739,801 A * | 4/1998 | Sheridon | 345/84 |
| 5,745,086 A | 4/1998 | Weber | 345/63 |
| 5,790,086 A | 8/1998 | Zelitt | 345/32 |
| 5,838,398 A * | 11/1998 | Ilisicin et al. | 349/32 |
| 5,838,494 A | 11/1998 | Araki | 359/455 |
| 5,939,826 A * | 8/1999 | Ohsawa et al. | 313/582 |
| 5,956,002 A * | 9/1999 | Martin et al. | 313/60 |
| 5,961,804 A | 10/1999 | Jacobson | 204/606 |
| 5,982,340 A | 11/1999 | Troche | 343/882 |
| 5,984,747 A * | 11/1999 | Bhagavatula et al. | 445/24 |
| 6,055,091 A | 4/2000 | Sheridon et al. | 359/896 |
| 6,249,271 B1 * | 6/2001 | Albert et al. | 345/107 |

* cited by examiner

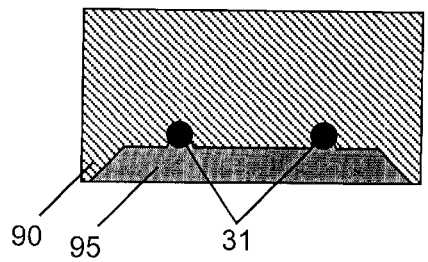 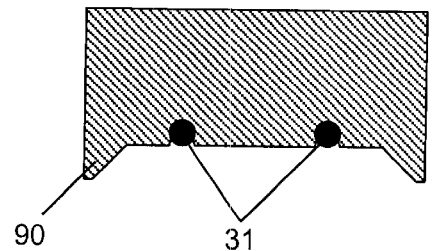
Figure 9a  Figure 9b
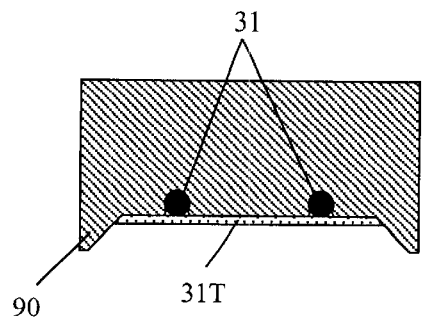
Figure 10
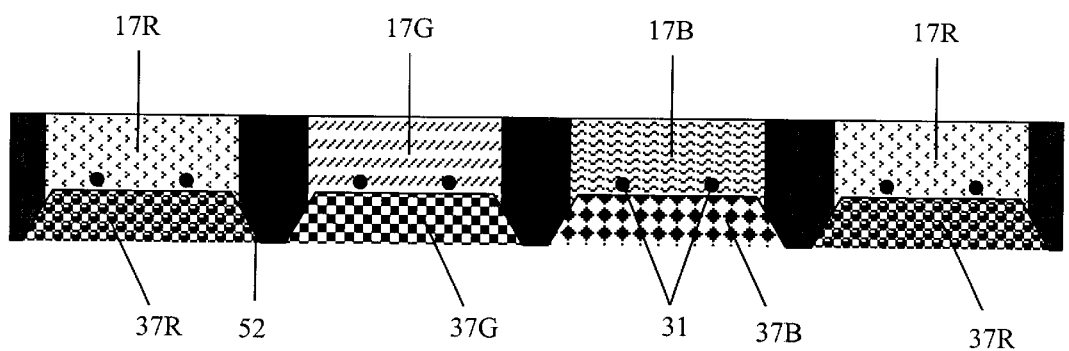
Figure 11

REFLECTIVE ELECTRO-OPTIC FIBER-BASED DISPLAYS

REFERENCE TO RELATED APPLICATIONS

This is a continuation-in-part of co-pending U.S. patent application Ser. No. 09/299,372, filed Apr. 26, 1999, entitled FIBER-BASED PLASMA ADDRESSED LIQUID CRYSTAL DISPLAY which is a continuation-in-part of Ser. No. 08/810,960, filed Feb. 27, 1997 now U.S. Pat. No. 5,984,747. The aforementioned application, is hereby incorporated herein by reference.

FIELD OF THE INVENTION

The invention pertains to the field of reflective displays and methods of manufacture. More particularly, the invention pertains to addressing electrophoretic, electrochromic, and bi-chromal sphere displays and fabricating such displays using fibers.

BACKGROUND OF THE INVENTION

There are several different methods of producing a reflective display. The most well known and widely used method is to use liquid crystal molecules as the electro-optic material. In the liquid crystal family, a vast range of molecules could potentially be used to create reflective displays. Some of these liquid crystal molecules include, twisted nematic, cholesteric-nematic, dichroic dye (or guest-host), dynamic scattering mode, and polymer dispersed to name a few. Most of these liquid crystal molecules require other films, such as, alignment layers, polarizers, and reflective films.

Another type of reflective display composing an electro-optic material is an electrophoretic display. Early work such as that described in U.S. Pat. No. 3,767,392, "Electrophoretic Light Image Reproduction Process", used a suspension of small charged particles in a liquid solution. The suspension is sandwiched between to glass plates with electrodes on the glass plates. If the particle have the same density as the liquid solution then they will not be effected by gravity, therefore the only way move the particles is using an electric field. By applying a potential 7 to the electrodes 5, the charged particles are forced to move in the suspension to one of the contacts. The opposite charge moves the particles to the other contact. Once the particles are moved to one of the contact they reside at that point until they are moved by another electric field, therefore the particles are bistable. The electrophoretic suspension is designed such that the particles are a different color than the liquid solution. Therefore, moving the particles from one surface to the other will change the color of the display. One potential problem of this display is the agglomeration of the small charged particles when the display is erased, i.e., as the pixel is erased the particles are removed from the contact in groups rather than individually. The invention of microencapsulating the electrophoretic suspension in small spheres solves this problem, U.S. Pat. No. 5,961,804, "Microencapsulated Electrophoretic Display." FIG. 1 shows the typical operation of a microencapsulated electrophoretic display. In this display the particles are positively charge and are attracted to the negative terminal of the display. The charged particles are white and the liquid solution they are suspended in is dark, therefore contrast in the display is optionally achieved by selectively moving some of the particles form one contact 5 to the other 5. In this type of display, the electro-optic material is the electrophoretic material and any casing used to contain the electrophoretic material.

A similar type of electro-optic display, a twisting ball display or Gyricon display, was invented by N. Sheridon at Xerox, U.S. Pat. No. 4,126,854, "Twisting Ball Display." It was initially called a twisting ball display because it is composed of small spheres, one side coated black, the other white, sandwiched between to electroded 5 glass plates. Upon applying an electric field 7 the spheres with a positive charged white half and relative negative charged black half are optionally addressed (rotated). Once the particles are rotated they stay in that position until an opposite field is applied. This bistable operation requires no electrical power to maintain an image. A follow on patent, U.S. Pat. No. 5,739,801, disclosed a multithreshold addressable twisting ball display. In this type of display, the electro-optic material is the bichromal spheres and any medium they may reside in to lower their friction in order to rotate.

The last major electro-optic display is that produced using an electrochromic material. An electrochromic display, similar to that in U.S. Pat. No. 3,521,941, "Electro-optical Device Having Variable Optical Density", is a battery which has one of the electrodes serving a display function. An electrochemical display stores electrical energy by changing it into chemical energy via an electrochemical reaction at both electrodes. In this reaction, electrochemically active material is plated-out on one of the contacts changing it from transparent to absorbing. FIG. 3 shows the typical reaction of an electrochromic display, where an electrochemical reaction from the applied voltage causes material to plate out on the negative terminal of the display. In this type of display, the electro-optic material is the electrochromic material, which is sandwiched between the electroded plates.

Most of the electro-optic displays have problems with addressing the display. Since most of the electro-optic materials do not have a voltage threshold, displays fabricated with the materials have to be individually addressed. Some of the liquid crystal materials use an active transistor back plane to address the displays, but these type of displays are presently limited in size due to the complicated manufacturing process. Transmissive displays using liquid crystal materials and a plasma addressed back plane have been demonstrated, U.S. Pat. No. 4,896,149, as shown in FIG. 4, however, a reflective display using such a technique has not be disclosed. In addition, displays fabricated using the plasma addressed back plane shown in FIG. 4 are also limited in size due to availability of the thin microsheet 33. One potential solution for producing large size displays is to use fibers to create the plasma cells as shown in FIG. 5. Using fibers to create a plasma cell was first disclosed in U.S. Pat. No. 3,964,050, and using fibers to create the plasma cell in a transmissive plasma addressed liquid crystal display was disclosed in U.S. Pat. No. 5,984,747.

SUMMARY OF THE INVENTION

The invention includes the use of fibers with wire electrodes to construct reflective fiber-based displays, where reflectivity is formed by modulating an electro-optic material within the display. A plasma channel is optionally built into the display to address the electro-optic material. The plasma channel is optionally totally contained within the fibers and addressed using wire electrodes. The wire electrodes are contained within the fiber or on the surface of the fiber. The fibers are optionally colored to impart color to the display, or are optionally black to serve as an absorbing layer to enhance the contrast of the display, or white to enhance the reflectivity of the display. The electro-optic material consists of a liquid crystal material, electrophoretic material, bichromal sphere material, electrochromic material, or any electro-optic material that can serve to create a reflective display. In addition, colored pigment is optionally added to the electro-optic material to impart color to the display. The fibers are optionally composed of glass, glass ceramic, plastic/polymer, metal, or a combination of the above.

BRIEF DESCRIPTION OF THE DRAWING

FIG. 9a schematically shows a cross-section of a top fiber structure with a dissolvable material used to expose the wire electrodes.

FIG. 9b schematically shows a cross-section of a top fiber structure in FIG. 9a with the dissolvable material removed, thus exposing the wire electrodes.

FIG. 10 schematically shows a cross-section of a top fiber structure with a conductive surface layer.

FIG. 11 schematically shows an array of top fiber structures composed of different colored fibers and different colored electro-optic material, both of which add color to the display.

DESCRIPTION OF THE PREFERRED EMBODIMENT

The invention includes the use of fibers with wire electrodes to construct reflective fiber-based displays, where reflectivity is formed by modulating an electro-optic material within the display. The wire electrodes are contained within the fiber or on the surface of the fiber. The fibers are optionally colored to impart color to the display, or are optionally black to serve as an absorbing layer to enhance the contrast of the display, or white to enhance the reflectivity of the display. The electro-optic material consists of a liquid crystal material, electrophoretic material, bichromal sphere material, electrochromic material, or any electro-optic material that can serve to create a reflective display. Most of these electro-optic materials are bistable in their operation. In addition, colored pigment is optionally added to the electro-optic material to impart color to the display. The fibers are optionally composed of glass, glass ceramic, plastic/polymer, metal, or a combination of the above.

Figure 1:
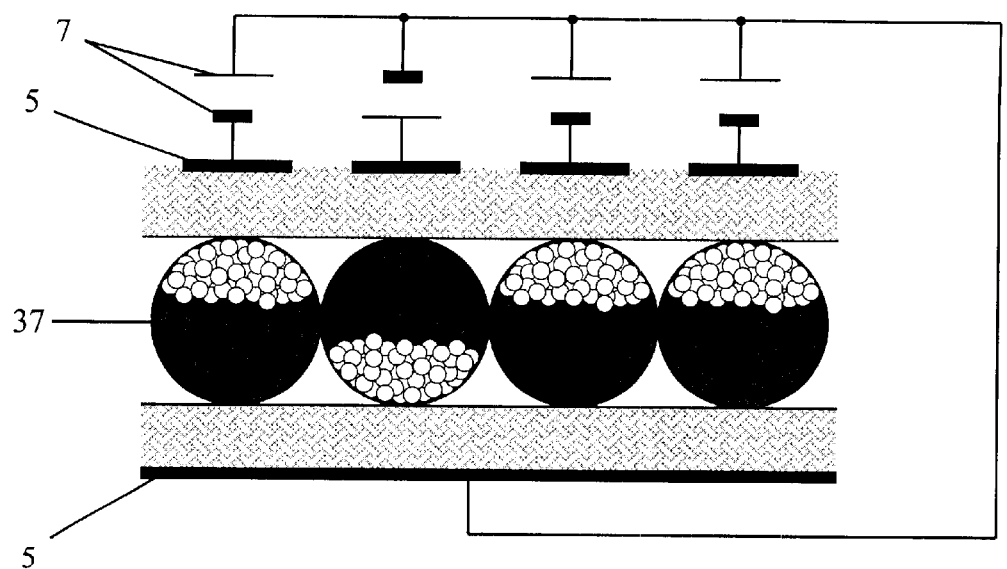
FIG. 1 schematically shows a cross-section and addressing of an electrophoretic display, in accordance with the prior art.
Figure 2:
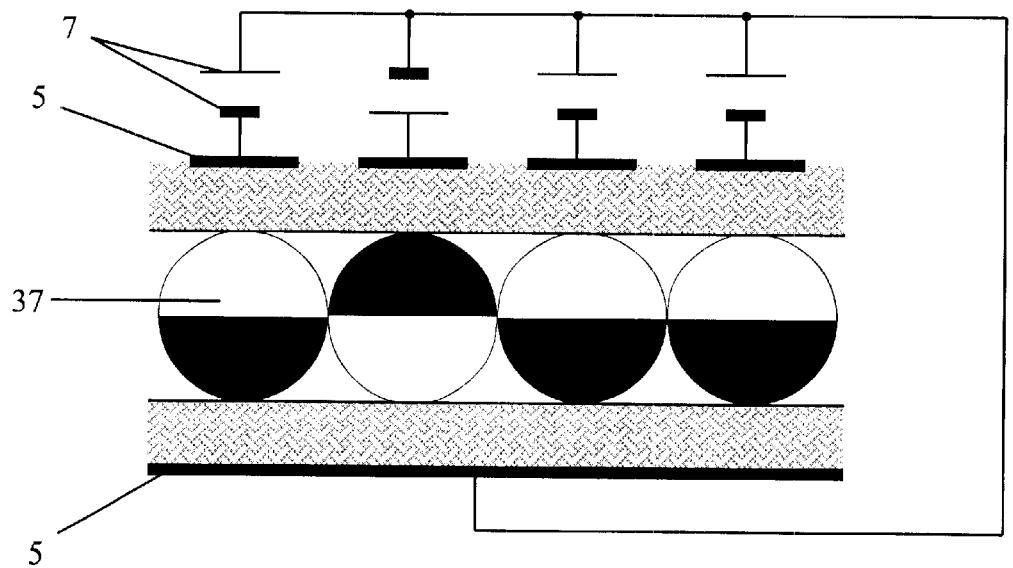
FIG. 2 schematically shows a cross-section and addressing of a bichromal sphere display in accordance with the prior art.
Figure 3:
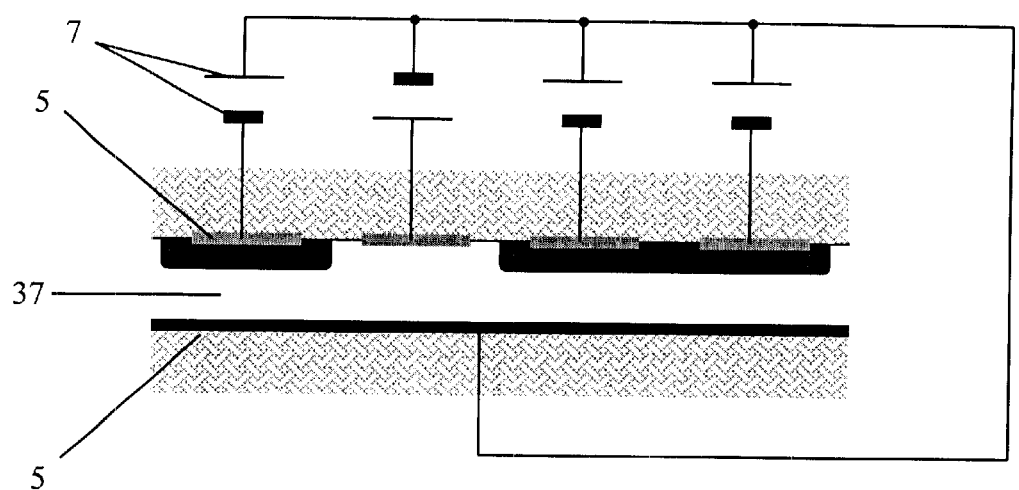
FIG. 3 schematically shows a cross-section and addressing of an electrochromic display in accordance with the prior art.
Figure 4:
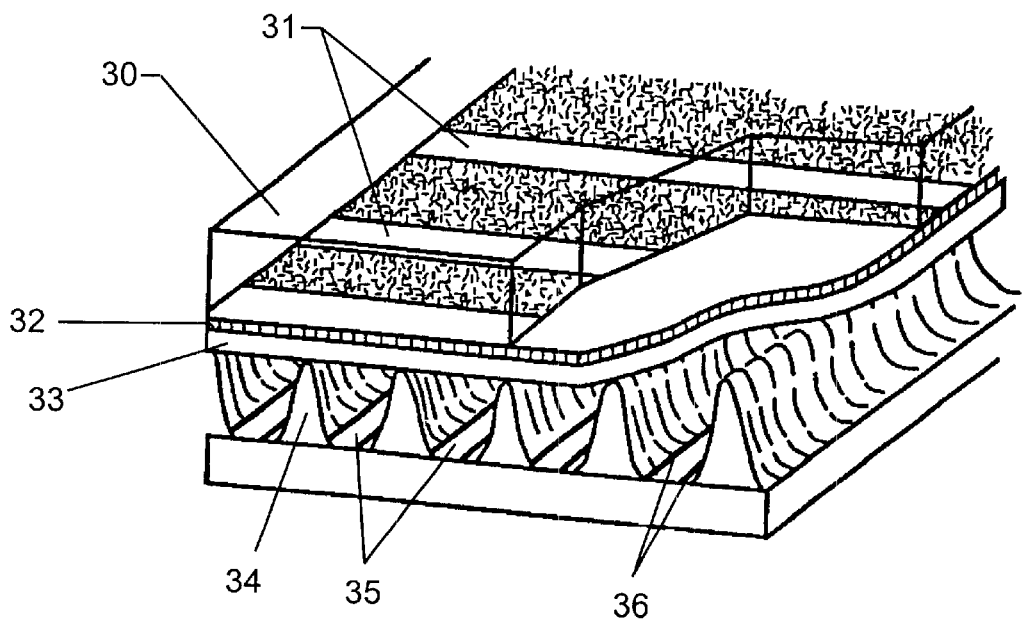
FIG. 4 illustrates a traditional PALC display in accordance with the prior art.
Figure 5:
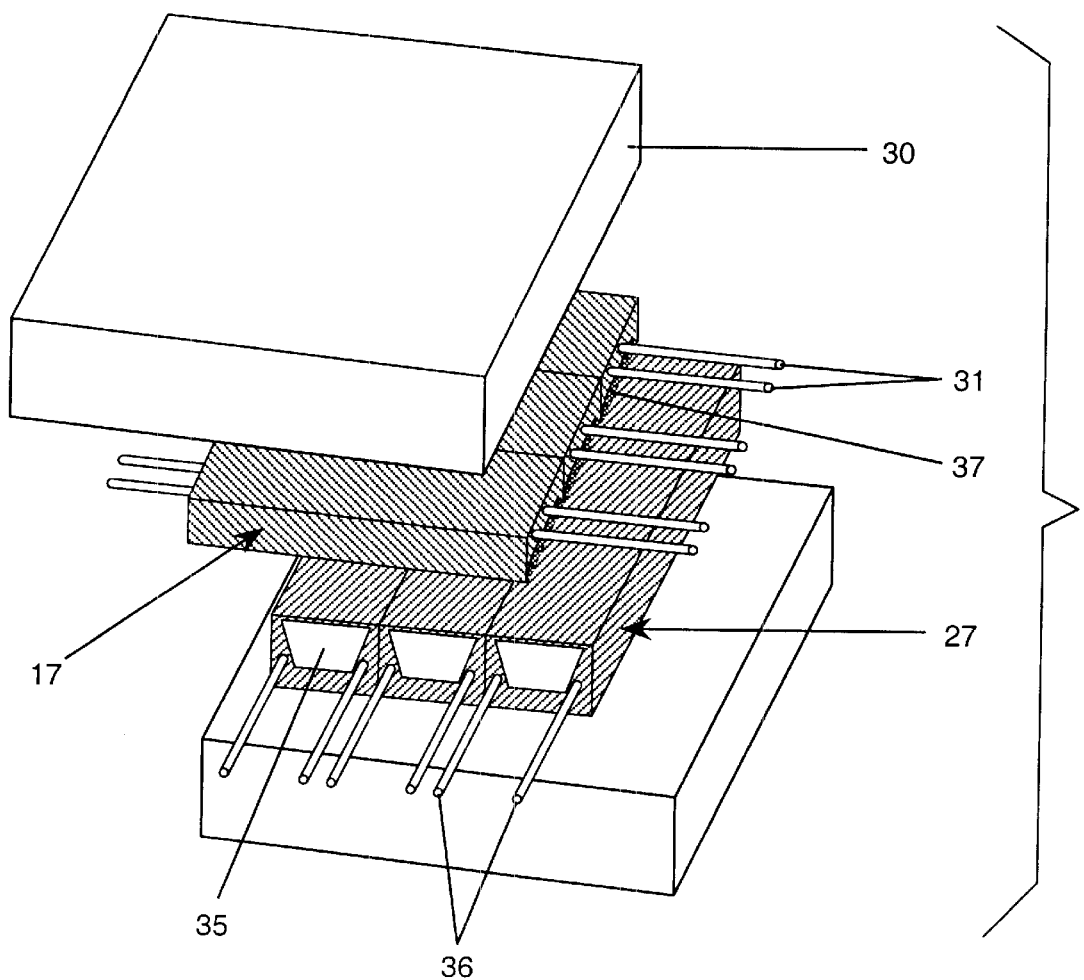
FIG. 5 illustrates a fiber-based PALC display.
Figure 6:
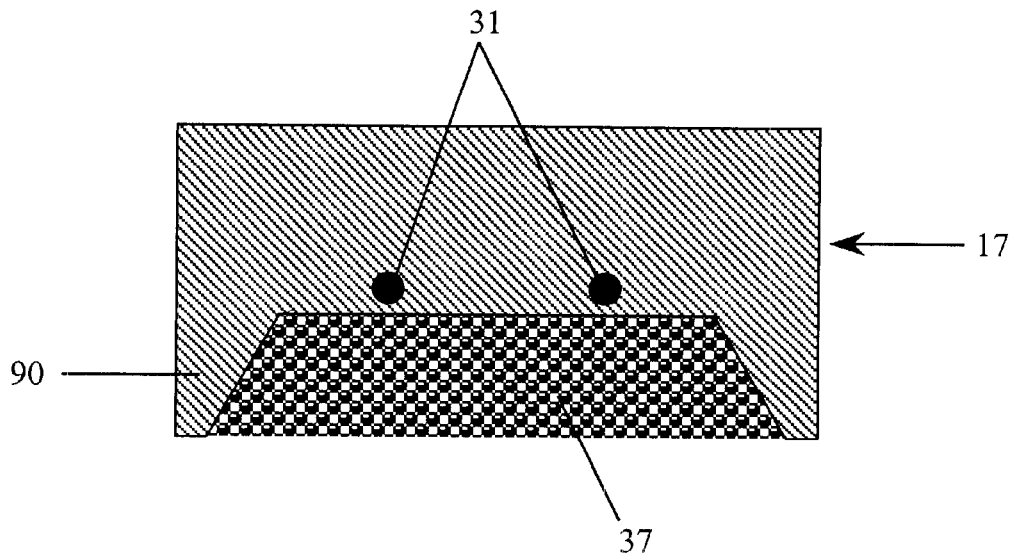
FIG. 6 schematically shows a cross-section of a top fiber structure containing ribs to form the structure that supports the electro-optic material.

FIG. 5 shows a schematic of a plasma addressed liquid crystal (PALC) display using both top 17 and bottom 27 fibers to create the structure in the display, as disclosed in U.S. patent application Ser. No. 09/299,372. Modifying the top fiber 17 in this fiber-based PALC display, such as shown in FIG. 6, would create a reflective display. To create a reflective display, the traditional liquid crystal, alignment layers and polarizers are replaced with an electro-optic material 37. Legs or ribs 90 are formed on the ends of the top fiber 17 to create a channel to support the electro-optic material 37. Upon operation, a plasma is ignited in the plasma channel 35 using the plasma address electrodes 36. The plasma creates many electrons and ions in the plasma channel 35. During the plasma glow period, a voltage is applied to the address electrodes 31 in the top fiber 17. This voltage, if positive relative to the plasma address electrodes 36, will pull electrons out of the plasma and plate them out on the upper inside surface of the plasma channels 35, directly below the electro-optic material 37. After the plasma is extinguished, the free carriers diminish from the plasma gas, leaving the electrons on the upper surface of the channel 35. Upon removing the applied voltage from the address electrodes 31, an electric field is set up between the deposited charge and the address electrodes 31. This electric field will slowly modulate the electro-optic material. Note that the plasma addressing time is much faster than the response time of the electro-optic material. Because the charge on the inner surface of the plasma cell 35 is not stable, the plasma may have to be addressed more than once per image frame in order to fully address the electro-optic material.

Gray scale images are optionally created in the display by controlling the address voltage or by dividing the addressing time into sections or bits, similar to the addressing scheme of a plasma display. The time the electrons are plated-out in the plasma channel 35 is optionally broken down into 8-bit increasing time domains, or 256 levels of gray scale. Another method of creating a gray scale image is to divide the address voltage between the address electrodes 31. Applying the full on address voltage to one of the address electrodes will cause the electro-optic material to switch below that wire electrode and not the other. Thus, two bits of gray scale are optionally created if there are two electrodes and the voltage is full on or full off. If the voltage is divided between the two electrodes and its magnitude is also controlled, then the total number of gray scale levels equals the voltage bits of gray scale times the number of electrodes. In addition, using separate wires to address a bichromal sphere twisting ball display would allow the ball to be rotated to specific angles. Rotating the ball to a specific angle not only controls the gray scale, but also controls the direction of the reflected light. Controlling the direction of reflected light is extremely useful to maximize the usage of a point light source, such as, for example, the sun.

Figure 7:
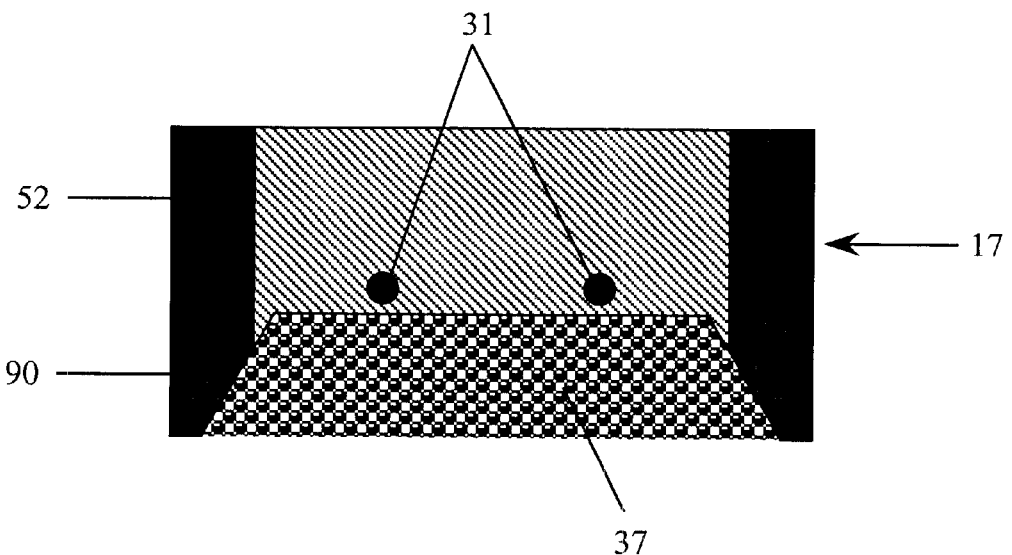
FIG. 7 schematically shows a cross-section of a top fiber structure with a built-in black matrix.

FIG. 7 is a schematic cross-section of a top fiber 17 similar to that shown in FIG. 6, except the sides of the fiber 52 are black or absorbing to create a black matrix function. The absorbing sides 52 are optionally included in the top fiber 17, or are optionally coated on the surface of the fiber 17. The fibers are optionally composed of either an inorganic material, such as, for example, glass, or an organic material, such as, for example, an organic polymer. The black matrix 52 helps to define the pixels and create a sharper image.

Figure 8A:
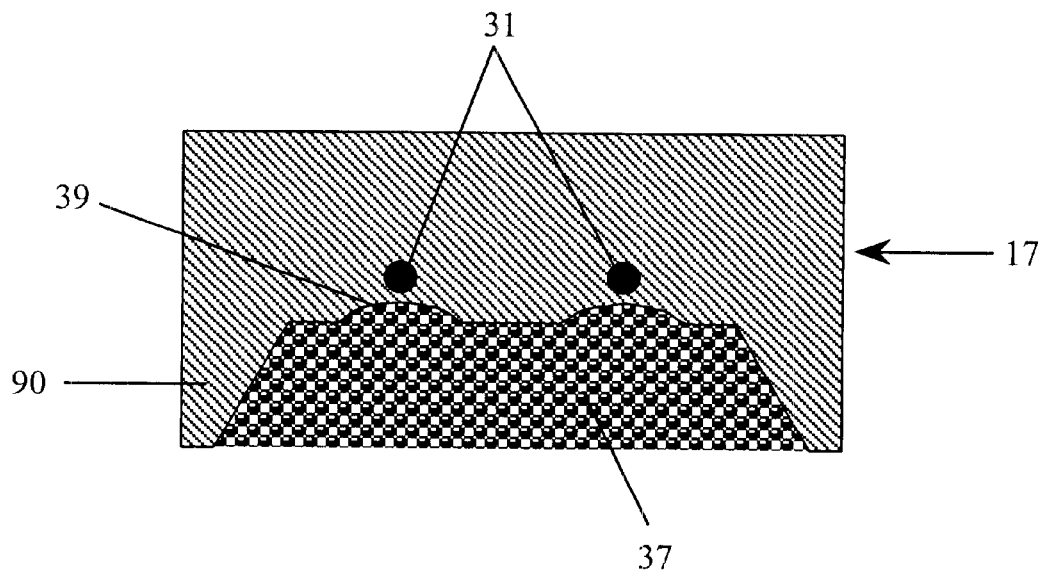
FIG. 8a schematically shows a cross-section of a top fiber structure with a contoured surface around the wire electrodes to control the electric field through the electro-optic material.
Figure 8B:
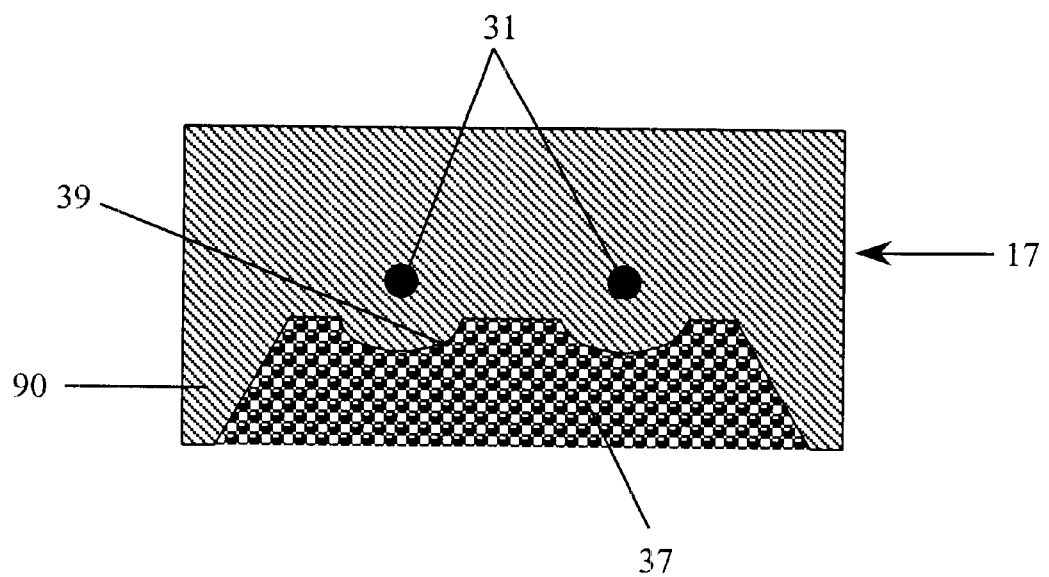
FIG. 8b schematically shows a cross-section of a top fiber structure with a contoured surface around the wire electrodes to control the electric field through the electro-optic material.

FIGS. 8a and 8b show a method of controlling the electric field around the address electrodes 31. Contouring the surface 39 of the top fiber 17 allows for tight control of the shape of the electric field lines through the electro-optic material 37. The voltage drop (electric field) from the address electrodes 31 to the electrons in the plasma channel is divided between the glass or plastic in the top fiber 17, between the address electrodes 31 and the surface of the fiber 39, the electro-optic material 37, and the thin glass membrane at the top of the plasma channel 35. In order to obtain close to vertical electric field lines in the electro-optic material 37, the surface 39 of the top fiber is modified, depending on the dielectric constant of the top fiber 17 material and the electro-optic material 37. FIG. 8a depicts a concave surface contour 39, which is needed to produce vertical electric field lines if the electro-optic material has the higher dielectric constant. FIG. 8b depicts a convex surface contour 39, which is needed to produce vertical electric field lines if the top fiber 17 material has the higher dielectric constant. Note that although the figures depict two address electrodes 31, any number of address electrodes can be used per pixel.

FIG. 9 shows a method of exposing the electrodes to the surface, using a lost glass process similar to that disclosed in patent application Ser. No. 09/299,394, "Lost Glass Process Used in Making Fiber-Based Displays", the disclosure of which is hereby incorporated herein by reference. A dissolvable glass 95 is optionally co-extruded with the base glass 27, to form a preform for fiber draw. The wire electrodes 31 are optionally drawn into the fiber, shown in FIG. 9a, and the dissolvable glass 95 is optionally subsequently removed with a liquid solution, as shown in FIG. 9b. Typical liquid solutions to dissolve the glass include, for example, vinegar and lemon juice. A dissolvable glass 95 is optionally used to hold the wire electrode in a particular location during the draw process. When the dissolvable glass 95 is removed, the wires become exposed to the environment outside the fiber. If the fiber is formed using a polymer, then two different polymers are needed, where one polymer is optionally removed without effecting the other. This removal process is optionally by wet etching, dry etching or thermal treatment. Creating a conductive path between the electrodes and the electro-optic material is necessary for the electrochromic displays.

FIG. 10 shows a method of creating a conductive surface by applying a conductive material 31T to the surface of the fiber and in contact to the conductive wire electrodes 31. This conductive material 31T must be transparent. The conductive layer is optionally added to the preform during the draw or extrusion process, or added to the fiber after it has been drawn.

FIG. 11 shows two different methods of adding color to the displays. First, the fibers 17R, 17G, and 17B are optionally colored. The fibers 17 are optionally colored by adding a color agent to the base fiber material before forming the fibers 17. The fibers 17 are optionally colored by applying a thin colored film to the surface of the fiber. Adding a color film to the surface is similar to what is done in the liquid crystal display industry to create a color filter. Another method of adding color to the display is to add color to the electro-optic material 37R, 37G, and 37B. In the bichromal sphere display, one half of the sphere can simply be made from a colored material. In the electrophoretic material the color is optionally added to either the small charged particles or the liquid suspension solution.

Figure 12:
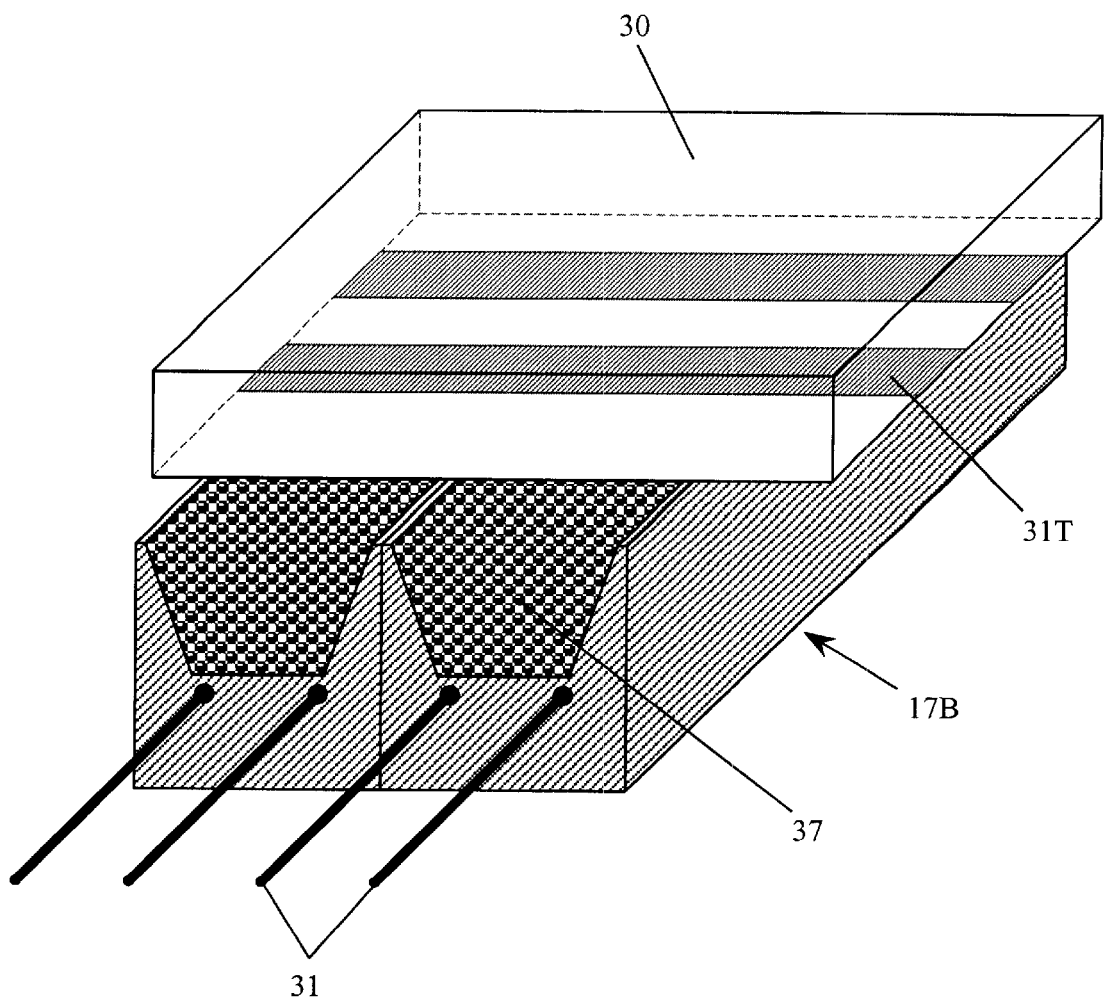
FIG. 12 schematically shows an array of fibers containing wire electrodes and ribs that create the structure to support the electro-optic material and a glass plate with transparent electrodes to form the opposite electrode surface.
Figure 13:
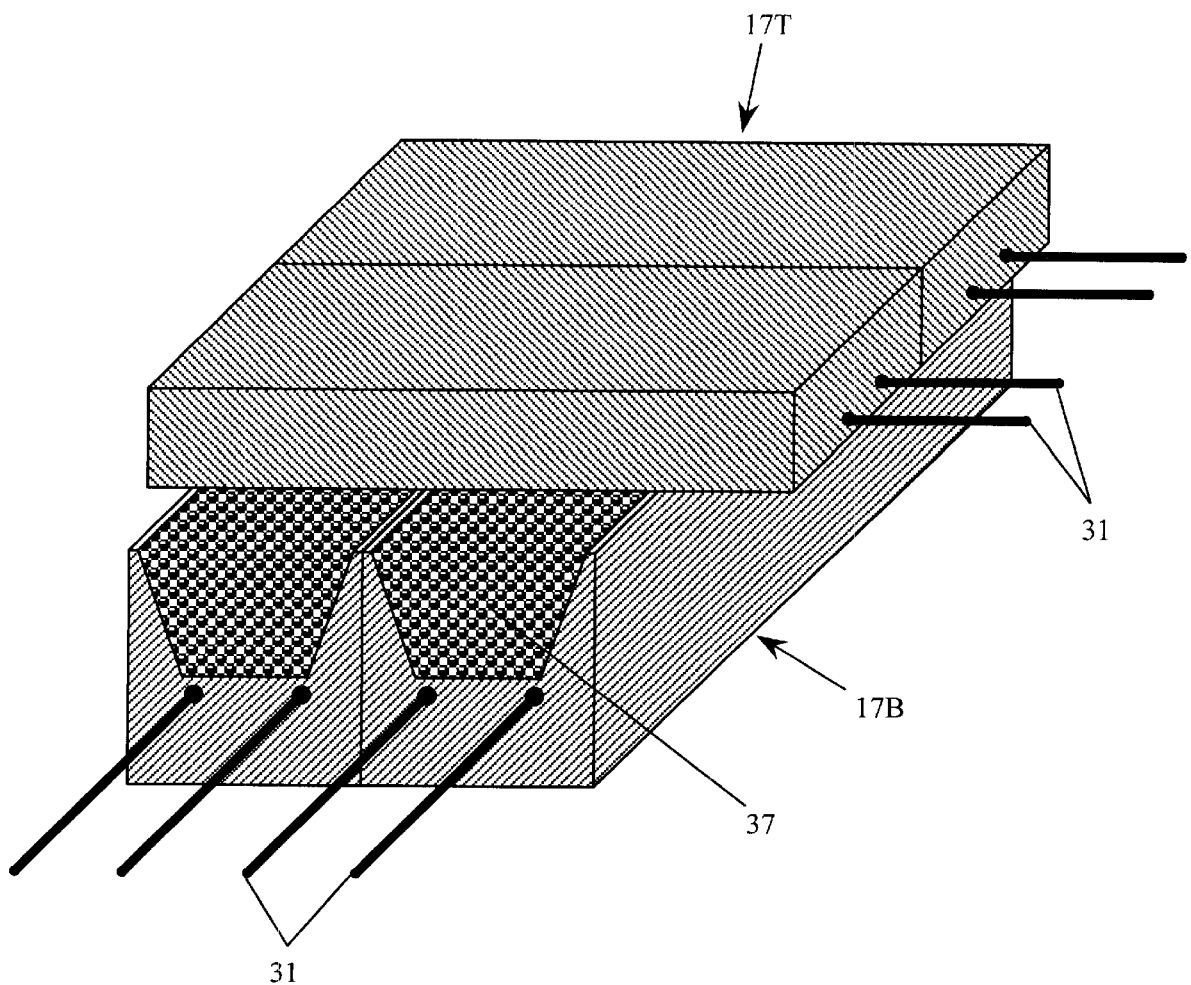
FIG. 13 schematically shows two orthogonal fiber arrays with wire electrodes, where the structure of the electro-optic display is formed using one of the fiber arrays.
Figure 14:
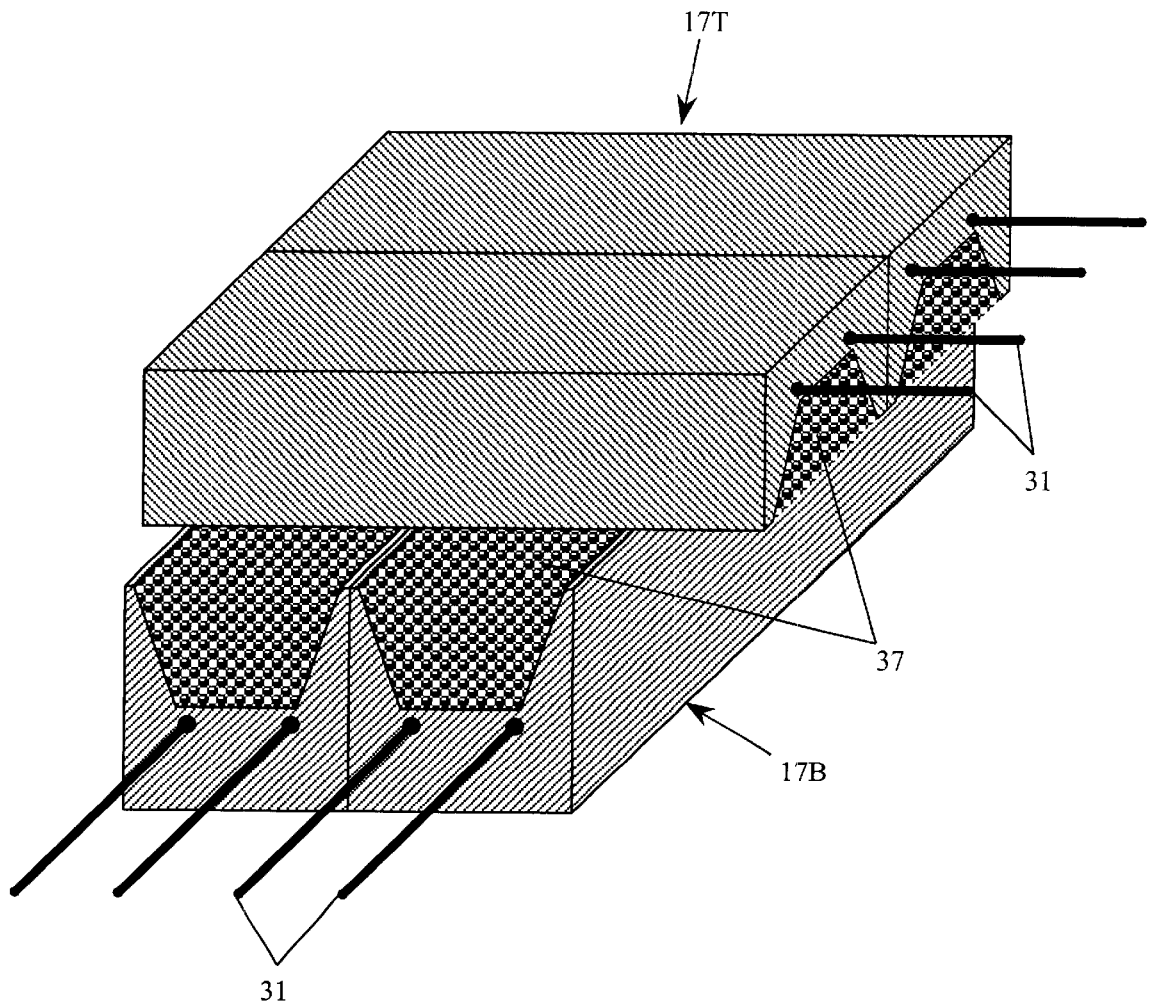
FIG. 14 schematically shows two orthogonal fiber arrays with wire electrodes, where the structure of the electro-optic display is formed using both fiber arrays.

FIG. 12 shows a reflective display with an array of bottom fibers 17B that form one half of the display, and a top plate 30 forming the other half. The bottom fibers 17B have channels that support an electro-optic material 37, and wire electrodes 31 to address the electro-optic material. The top plate 30 has transparent electrodes 31T to address the electro-optic material 37. To complete the display, a substrate may be required below the bottom fibers 17B, such that the fiber array 177B is sandwiched between the two plates. The plates are optionally made of glass or plastic. The top plate is optionally replaced with an array of fibers 17T to make a total-fiber display, as shown in FIG. 13. This total-fiber display may have to be sandwiched between two plates to add rigidity to the display. Additional structure is optionally added to the top fiber 17T to form a channel to support an electro-optic material 37, as shown in FIG. 14. Identical fibers are optionally used for the top 17T and bottom 17B fiber arrays. Note that the fibers are not rigid and are optionally bent around a curved surface, therefore fabricating a curved display.

One problem with using an array of fibers to create the structure of the reflective display is presented by the additional surfaces created between the top plate 30 and the fiber array 17. These additional surfaces create a reflection, which lowers the contrast ratio of the display. To reduce or eliminate these reflections, a flowable polymer material is optionally included into the structure between the top plate 30 and the fiber array 17. A polymer material, such as, for example, ethylvinyl acetate, EVA, is optionally used to remove these reflections.

Figure 15:
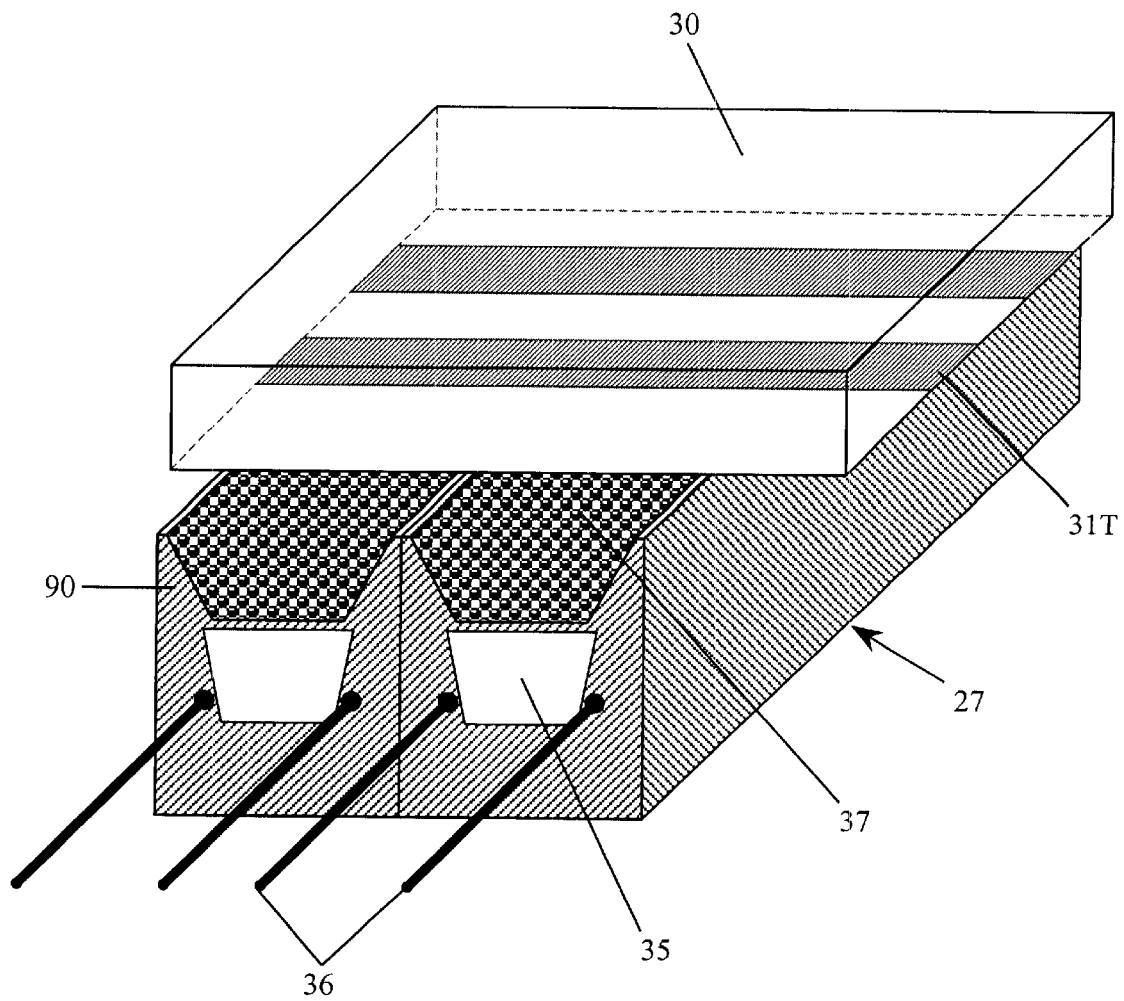
FIG. 15 schematically shows an array of fibers containing plasma channels with wire electrodes to address the plasma channels and ribs to form the structure in the electro-optic display, and a glass plate with transparent electrodes to form the opposite electrode surface.
Figure 16:
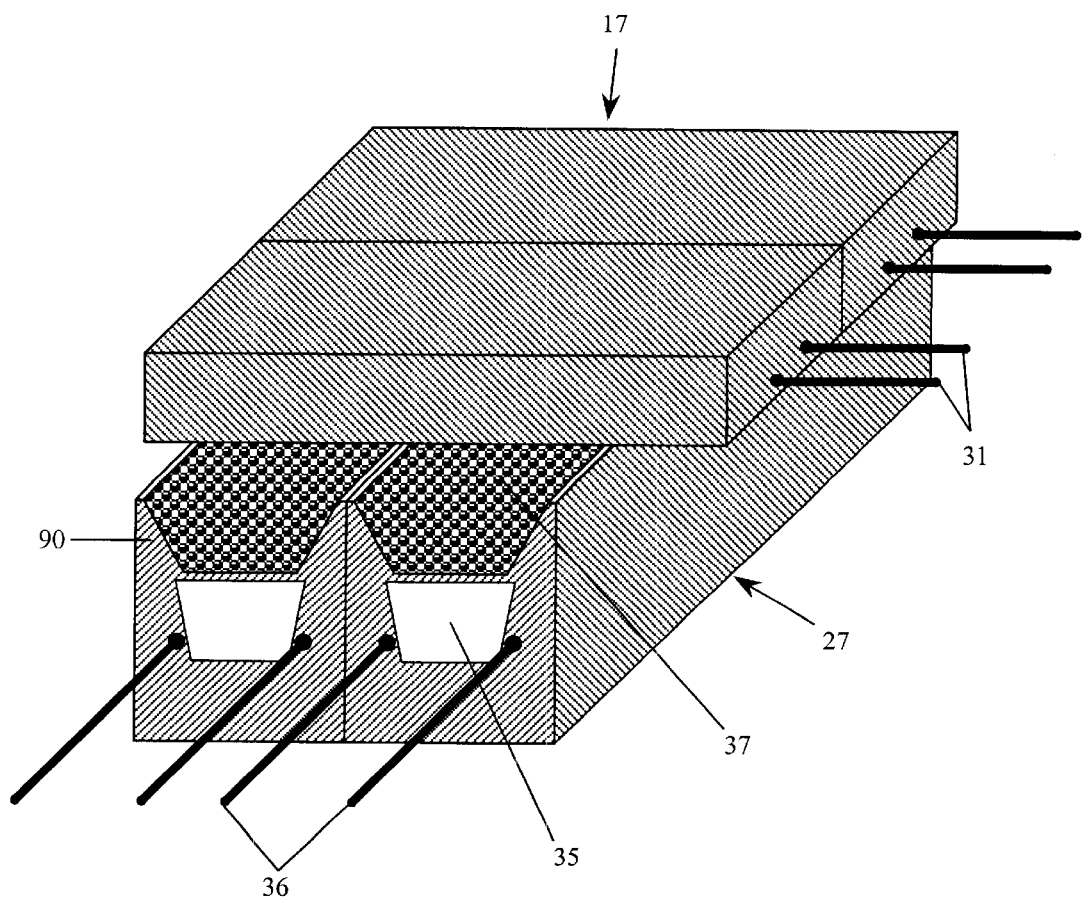
FIG. 16 schematically shows an array of fibers containing plasma channels with wire electrodes to address the plasma channels and ribs to form the structure in the electro-optic display, and a second orthogonal fiber array with wire electrodes to form the opposite electrode surface.

FIG. 15 shows a reflective electro-optic display, similar to that shown in FIG. 5 and FIG. 6, except the spacers 90 that create a channel for the electro-optic material 37 are contained in the bottom fibers 27. This type of display is operated very similarly to the one in FIG. 5. A plasma is ignited in the plasma cell region 35 using the plasma address electrodes 36, and a voltage is applied to the transparent electrodes 31T in the top plate 30. This applied voltage pulls electrons out of the plasma and plates them out on the upper inside surface of the plasma channel 35. After the plasma is distinguished and the voltage removed from the transparent electrodes 31, an electric field is generated between the plated-out charge and the transparent electrodes 31T. The electric field modulates the electro-optic material 37. Replacing the top plate 30 with fibers containing wire electrodes 31, as shown in FIG. 16, creates a total-fiber plasma display. Creating a total-fiber display not only allows for the fabrication of very large displays, but also allows for fabrication of curved, 3-D, and multiple view displays, if a lens function is built into the top fiber 17, as discussed in patent application entitled "FIBER-BASED DISPLAYS CONTAINING LENSES AND METHOD OF MAKING SAME," filed on Mar. 2, 2000, the complete disclosure of which is hereby incorporated herein by reference. A lens built into the top fiber 17 alters the refection of the light going through the fiber. The lens is used to create a three-dimensional (3-D) image by changing the focus of light passing through the fiber. The lens is also be used to direct the light that passes through the fiber. Directing the light yields a brighter image in a given location, and can optionally create multiple images. Note that 3-D and multiple-view reflective displays may require more than one fiber with a given lens function to create such images.

Figure 17:
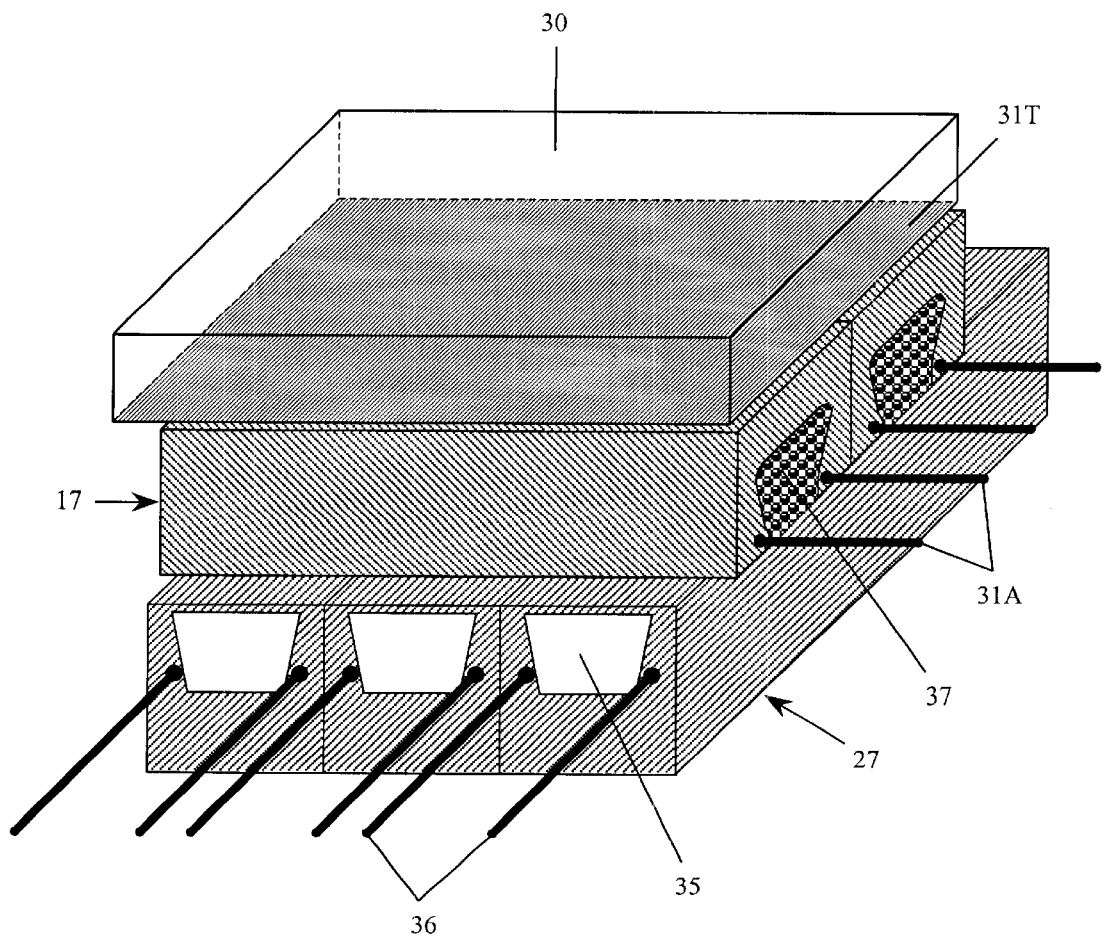
FIG. 17 schematically shows an array of fibers containing plasma channels with wire electrodes to address the plasma channels, a second orthogonal fiber array with wire electrodes to address the display, and a glass substrate with a transparent electrode coating to modulate the electro-optic material.
Figure 18:
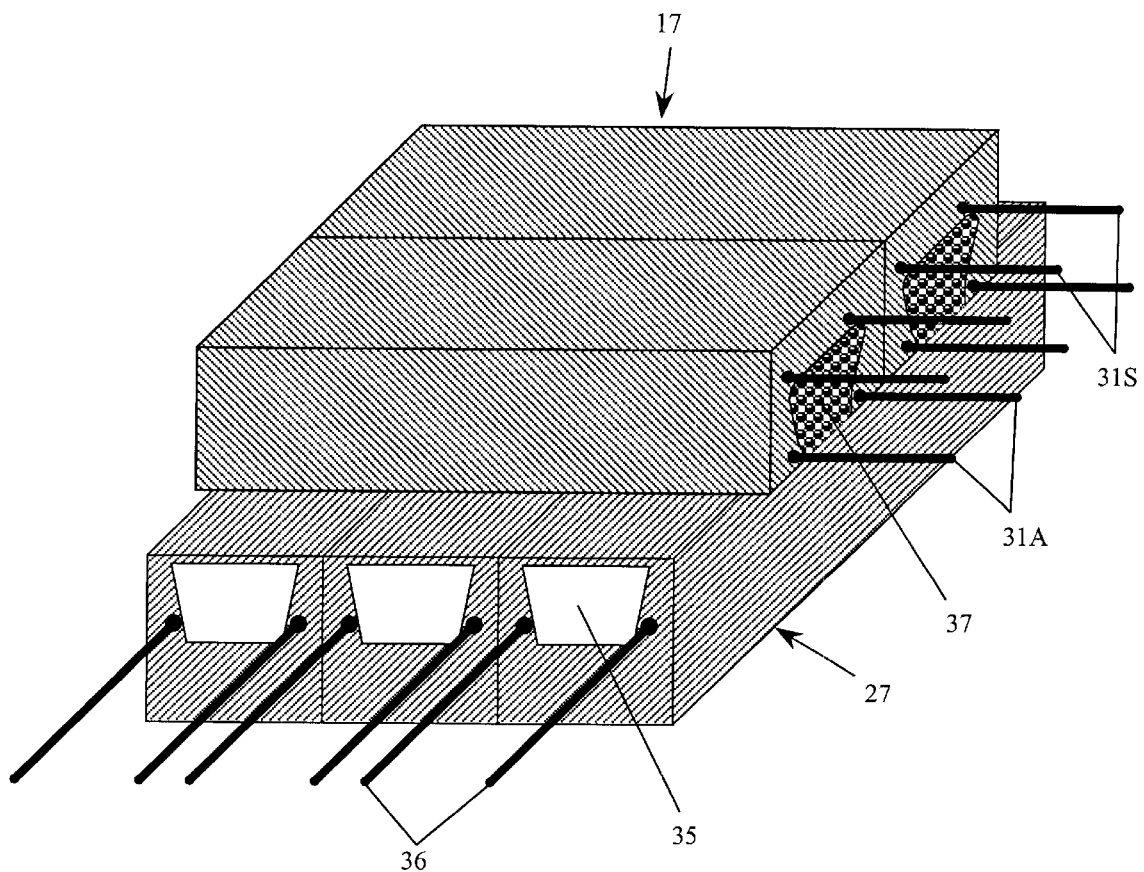
FIG. 18 schematically shows an array of fibers containing plasma channels with wire electrodes to address the plasma channels and a second orthogonal fiber array with two sets of wire electrodes; one to address the display and one to modulate the electro-optic material.

One problem in the art is addressing the plasma in the bottom fibers over a long distance and creating a vertical electric field through the electro-optic material. The display shown in FIG. 17 solves both of these problems. The bottom fibers 27 are used to address the plasma, as explained above. The top fibers 17 are designed to both support the electro-optic material 37 and address the plasma, using the wire address electrodes 31A. The top glass plate 30 has a transparent conductive layer 31T that is used as the ground plane for the plated-out charge in the plasma cells 35, hence creating an electric field through the electro-optic material 37. The extra set of electrodes 31A and ground plane electrode 31T make the display extremely easy to fully write or fully erase the electro-optic material 37. The ground plane electrode 31T is optionally included in the top fiber to create a total-fiber display, as shown in FIG. 18. In this case, the ground plane electrodes 31S are optionally individually addressed per each top fiber 17.

Figure 19:
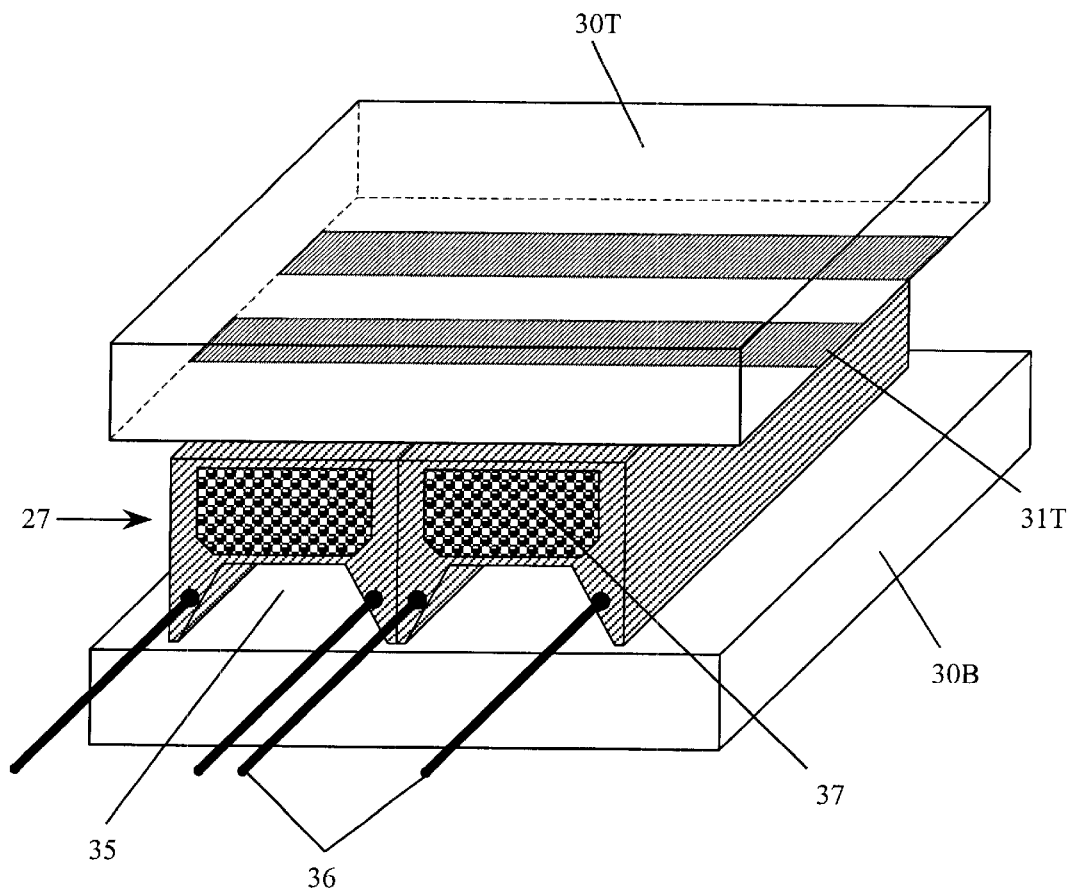
FIG. 19 schematically illustrates a reflective display where the electro-optic material is contained within a fiber.

FIG. 19 illustrates a reflective display where the electro-optic material 37 is totally contained within the fiber 27. The electro-optic material 37 is addressed using a plasma similar to that explained above, but the plasma channel is formed by making a vacuum-tight seal between the fibers 27 and the bottom plate 30B, or between the two plates 30T and 30B. The plasma electrodes 36 are used to ignite the plasma in the plasma channel 35, and the transparent electrodes 31T on the top plate 30T, are used to pull the electrons out of the plasma and plate them out on the upper top surface of the plasma channel 35. In this display, like the above display, the plasma is addressed one line at a time along the plasma channels.

Figure 20:
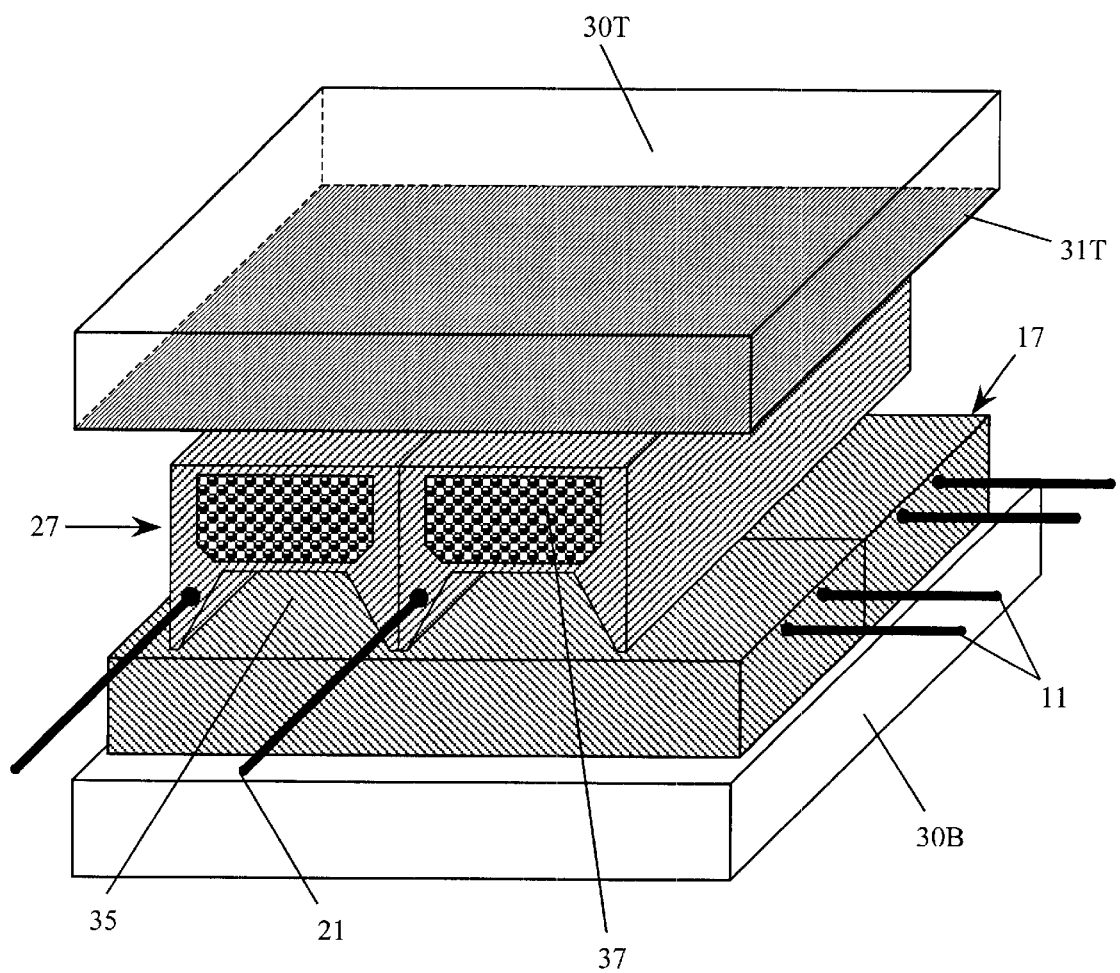
FIG. 20 schematically illustrates a reflective display where the plasma to address the electro-optic material is addressed at every pixel location.
Figure 21:
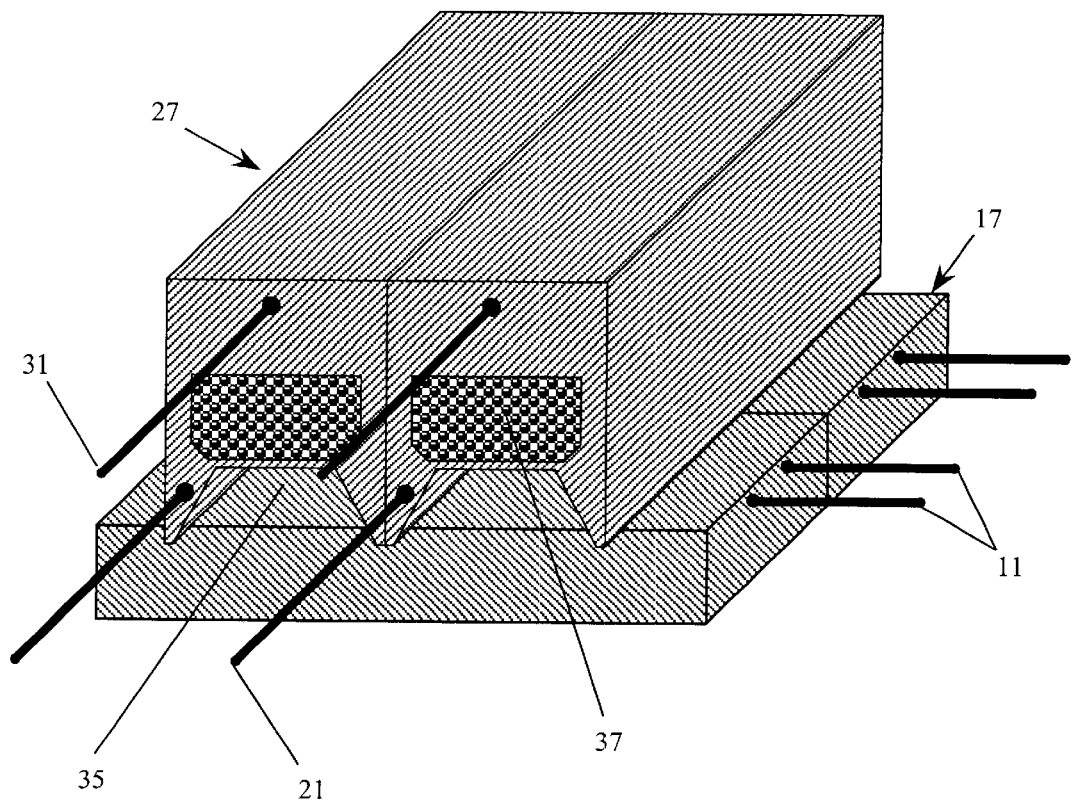
FIG. 21 schematically illustrates a total-fiber reflective display where the electro-optic material is contained within a fiber and the display is plasma addressed.

FIG. 20 illustrates a different method of addressing the plasma part of the display. The addressing technique is similar to that of a surface discharge plasma display. In this example, sets of parallel sustain electrodes 11 extend the length of the "top" fibers 17. An AC voltage is applied to the sustain electrodes 11, which is large enough to sustain a plasma, but not large enough to ignite the plasma. A short voltage pulse is then added to the plasma address electrodes 21 at the pixel location where addressing is desired. This short voltage pulse adds to the electric field of the sustain electrodes and locally ignites the plasma. After all the plasma cells are written, a voltage is applied to the top transparent conductive electrode 31T to pull the electrons out to the plasma and plate them out on the upper inside surface of the written plasma channels 35. After the electrons are plated out, the voltage on the transparent electrode 31T is removed, and an electric field is produced across the electro-optic material 37 as a result of the stored charge. A total-fiber display is optionally constructed by including the transparent electrode 31T into the "bottom" fiber 27, as shown in FIG. 21. In this case, wire electrode 31 serves as the address electrode for the electro-optic material.

Figure 22:
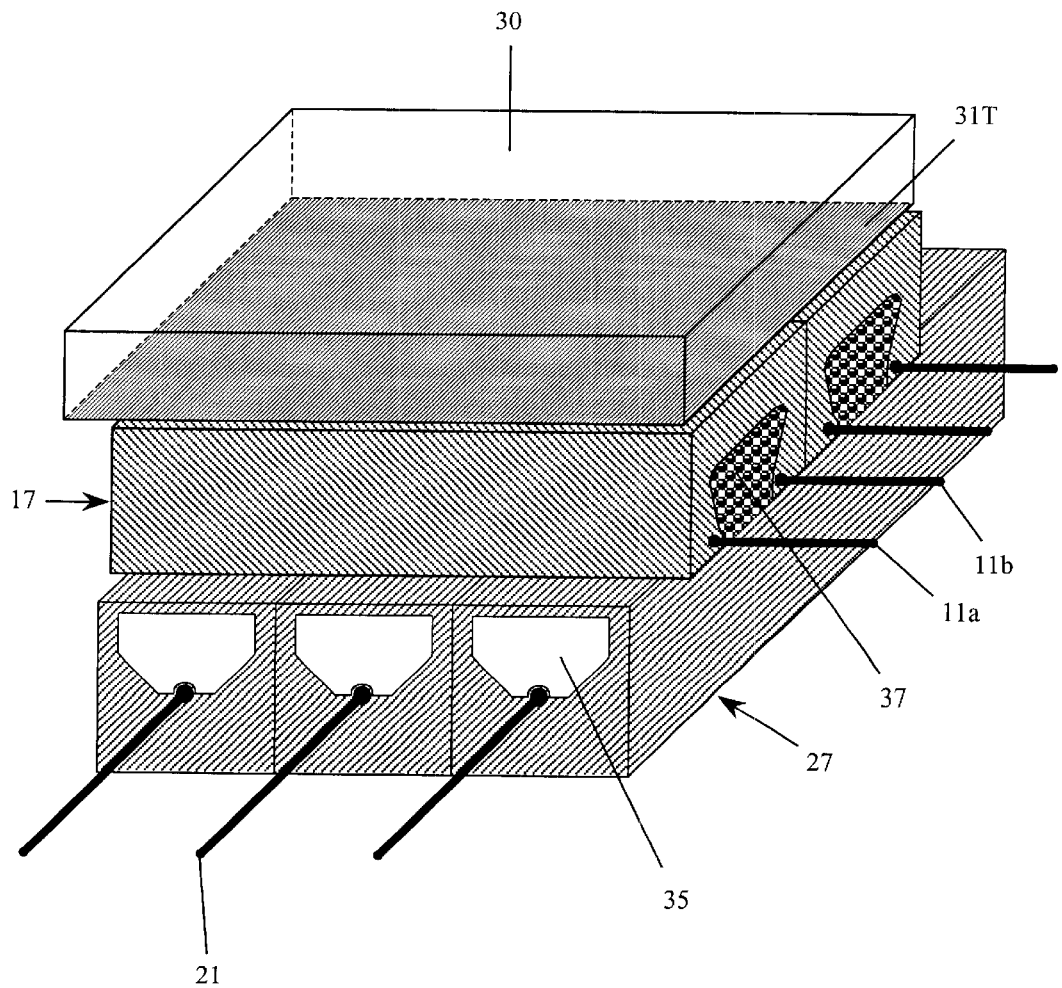
FIG. 22 schematically illustrates a reflective display where the plasma is confined and addressed at each individual pixel.

One potential problem with the reflective display discussed in FIGS. 19–21 is that the entire display will have to be glass frit sealed around the perimeter of the display to contain the plasma gas. This glass flit-sealing step usually requires a process temperature of about 400° C., which could cause harm to the electro-optic material, especially if it is composed of an organic material. One method of addressing the plasma at each pixel in the display and containing the plasma in individual tubes is shown in FIG. 22. In this figure, sustain electrodes 11a and 11b along with the electro-optic material 37 are contained in one fiber 17. This fiber array 17 is placed over and orthogonal to a second fiber array 27 that contains the address electrode 21 and the plasma cell region 35. There are two traditional methods used to address a capacitively coupled plasma. The first is to essentially tie electrodes 11a and 11b together and use them as one electrode and electrode 21 as the other. Applying a voltage between the electrodes (11a, 11b) and 21 will ignite the plasma in the plasma cell region 35 at the crossing of the two electrodes. The plasma is sustained by applying an AC voltage between the electrodes. During the AC voltage electrons are swept back and forth between the address electrodes. These electrons plate out on the dielectric material around the electrode and are used to assist the igniting of the plasma in the next cycle of the AC voltage. Therefore, these electrons can be used to address the electro-optic material by choosing the proper phase of the AC voltage to stop the plasma addressing. If the pixel is to be ON, i.e. the electro-optic material is to be modulated, then the last plasma addressing of the pixel should be with a positive voltage on electrodes 11a and 11b. Likewise, if the pixel is to OFF then the positive voltage should be applied to electrode 21 during the last plasma addressing cycle. Choosing the phase to stop the plasma addressing will determine whether or not there are electrons plated out at the top of the plasma channel 35 to address the electro-optic material 37. These plated-out electrons serve to create a field between the electro-optic material by communicating with the electrode 31T above the electro-optic material 37. In addition, the electrode 31T on the top plate 30 can be replaced with wire electrodes 31S at the top of the fiber 17 as shown in FIG. 18. The second traditional method of addressing the plasma at each individual pixel is to apply an AC voltage between electrodes 11a and 11b that is high enough to sustain a plasma, but not high enough to ignite a plasma in the plasma cell region 35. Then by applying an address voltage to electrode 21 the plasma can be locally ignited. Each phase of the AC will result in electrons, which are plated out on the dielectric layer around one of the sustain electrode, leaving the sustain electrode (11a), creating a plasma glow, and plating out around the other sustain electrode (11b). The only way electrons will be plated out around any electrode is if a high enough electric field exists to ignite the plasma and create ionization/electrons. Therefore, if the pixel is written then electrons are plated out on the top of the plasma channel 35 and can be used to address the electro-optic material. One potential problem with this second addressing scheme is that the electrons are plated out locally around one of the two sustain electrodes, 11a or 11b, depending on which phase of the AC was last used. This local collection of electrons may result in incomplete addressing of the electro-optic material 37 because of the non-uniform electric field through the electro-optic material 37. One method of combating this problem is to use adjacent pairs of sustain electrodes as single sets of sustain electrodes. Combining the sustain electrodes can be done by simply tying each pair of sustain electrodes 11a and 11b together and use them as a single sustain electrode (11a). The second sustain electrode (11b) will result by tying an adjacent sustain electrode pair together. Using an interlaced addressing technique will be the best method of addressing the entire display, since each fiber 17 only contains one of the sustain electrodes. However, tying the two sustain electrodes 11a and 11b together will allow for the plasma to spread over the top of the plasma channel 35 in the bottom fiber 27 below and between the sustain electrodes 11a and 11b. These electrons can them be used to address the electro-optic material 37.

Figure 23:
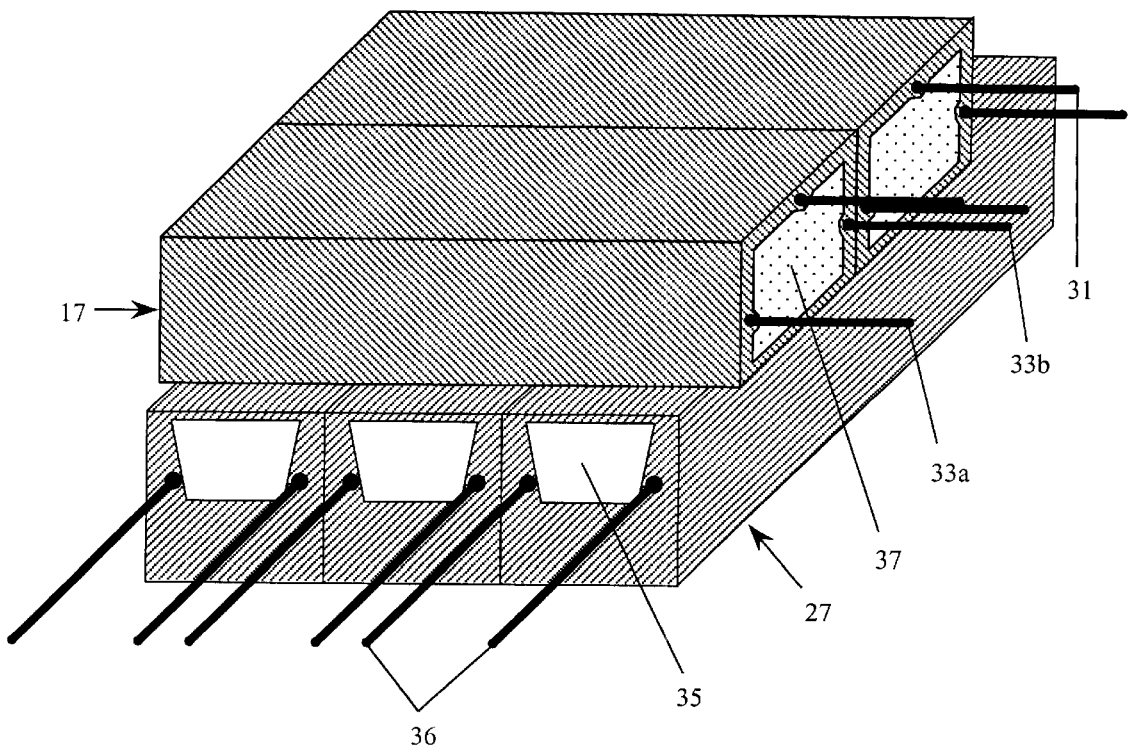
FIG. 23 schematically illustrates a transflective display.
Figure 24A:
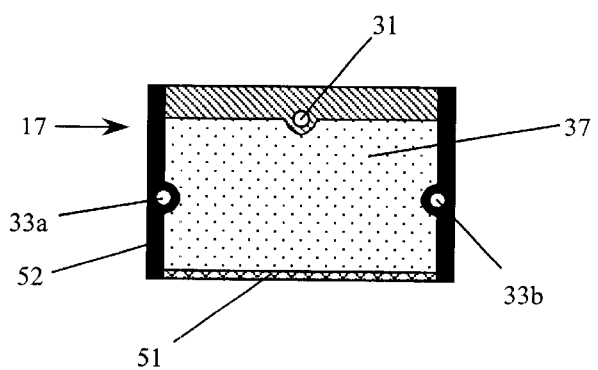
FIG. 24a schematically shows the top fiber in FIG. 23 with absorbing sides and a reflective base.

FIG. 23 represents a fiber-based display that can be operated in both a transmissive and reflective mode, referred to as a transflective mode. The display has an array of bottom fibers 27 that have plasma tubes 35 to address the electro-optic material by plating out electrons like stated above, however since the display has to work in a transmissive mode the fibers 27 have to be clear or translucent. The top fibers 17 have at least three sets of electrodes and a channel for the electro-optic material 37. The two set of side electrodes 33a and 33b are used to address the electro-optic material in the plane of the display and electrode 31 is used to modulate the electro-optic material 37 using the charge from the plasma 35 similar to that discussed above. It will be beneficial to design a black matrix 52 into the top fiber 17 as shown in FIG. 24a. This black matrix will create a sharper image and block the light not going through the electro-optic material. In addition, a reflective layer 51 could be added to the bottom of the top fiber 17. This reflective layer 51 could be included in the top fiber 17 or could be coated on the surface of the fiber. If the top fiber 17 is composed of glass the bottom of the fiber could be composed of an opal glass, which will reflect the light, but also let some of the light pass through. It would be preferred to fabricate the top fiber 17 out of plastic because of weight and ease of formation. If a polymer material is used to fabricate the top fiber 17 a reflective material could be used that would allow light to pass through if coming from underneath but reflect light coming through the electro-optic material. A coating could also be applied to the fiber preferably on the outer surface. This coating could act similar to a one-way mirror, where light coming through the fiber is reflected, however light coming from underneath is passed through.

Figure 24B:
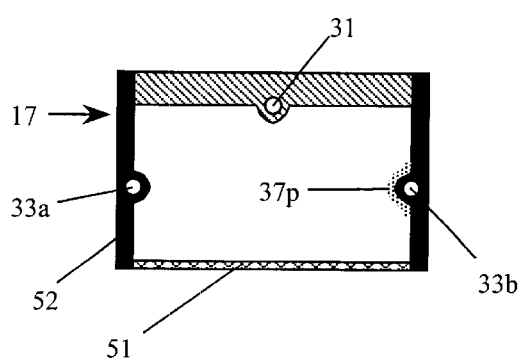
FIG. 24b schematically shows the top fiber in 24a with the particles in the electrophoretic material pulled to one of the side contacts.
Figure 24C:
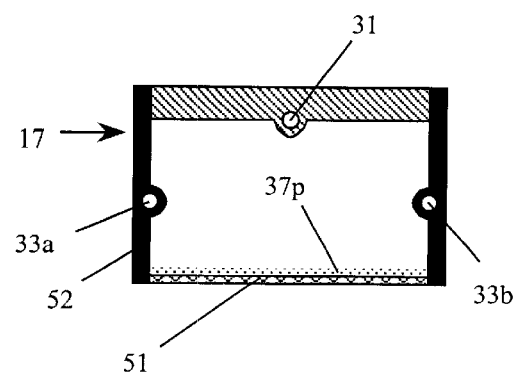
FIG. 24c schematically shows the top fiber in 24a with the particles in the electrophoretic material pulled to the bottom of the channel.

The two preferred electro-optic materials 37 for the transflective display are the bichromal sphere (Gyricon) and electrophoretic material. One potential operation of the display using an electrophoretic material is to fill the electro-optic channel with a dilute solution of absorbing particles 37p in a colored or clear liquid. Then by applying a voltage between electrodes 33a and 33b the absorbing particles 37p will move through the liquid to one of the two contact, as shown in FIG. 24b. Moving the absorbing particles to one of the two electrodes, 33a or 33b, will open-up the center region of the top fiber 17 for light to pass through. Assuming the display is being back-lit then the light can pass directly through the display. If the display is being operated in a reflective mode and there is a reflective material 51 on the bottom side of the top fiber 17 or the bottom fiber 27 is reflective then light traveling through the display will be reflected back out of the display. If color is desired then either the top fiber can be coated with a color die, or be composed of a colored material, or the electrophoretic liquid solution could be colored. To change the gray scale of the display or make it dark the absorbing particles 37p can be moved to the bottom of the electro-optic cell region, as shown in FIG. 24c. The absorbing particles can be attracted to this surface by addressing the display using the plasma channel 35 and the addressing electrode 31 as discussed above. Voltages could also be applied to the side electrodes 33a and 33b to create the proper electric field to assist in moving the absorbing particles to the bottom of the electro-optic cell region 37. Gray scale can be achieved by only moving part of the absorbing particles 37p to the bottom of the electro-optic cell region 37.

Figure 24D:
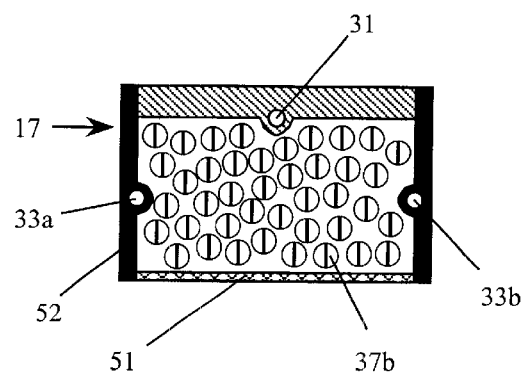
FIG. 24d schematically shows the top fiber in 24a with bichromal spheres aligned using an in plane voltage.
Figure 24E:
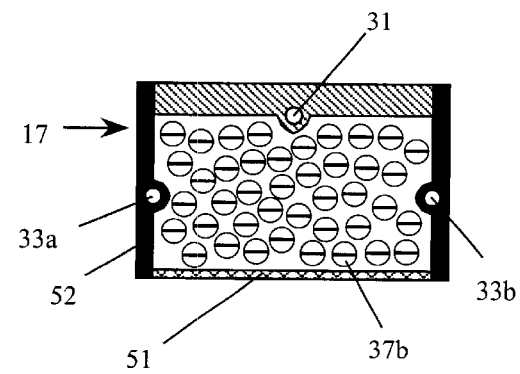
FIG. 24e schematically shows the top fiber in 24a with bichromal spheres aligned using a voltage normal to the plane of the display.

Creating a transflective display using bichromal spheres is similar in operation to that using electrophoretic materials except that bichromal spheres are only rotated and not translated. FIG. 24d shows the position of the bichromal spheres when a voltage is applied in the plane of the display or between electrodes 33a and 33b. In this example the bichromal spheres 37b are clear or colored with an absorbing material in a slice through the center of the sphere. When light passes through the display it is effected little by the spheres 37b since the light is travelling in the same direction as the plane of the absorbing layer. Color could be added to the fiber 17 as discussed above or it could be added to the spheres 37b. The color could also be added to the liquid solution that suspends the spheres 37b in the electro-optic region 37. Changing the gray scale is achieved by addressing the pixel using the plasma channel 35 and the electro-optic address electrode 31 as discussed above. Different levels of gray scale can be achieved by only rotating some of the spheres or by rotating them to a given angle.

Figure 25A:
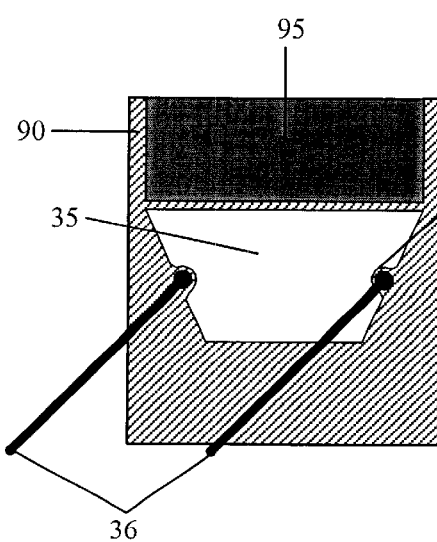
FIG. 25a schematically shows a cross-section of a bottom fiber structure with a dissolvable material used to hold the tolerance in the fiber during the draw process.
Figure 25B:
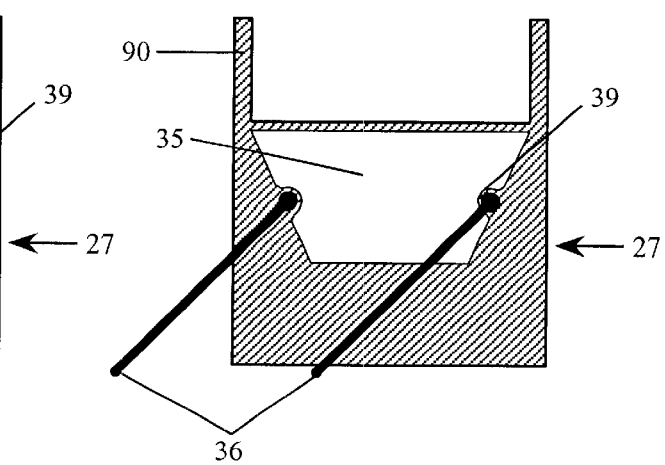
FIG. 25b schematically shows a cross-section of a top fiber structure in FIG. 20a with the dissolvable material removed.

One potential difficulty in fabricating these complex-shaped fibers is maintaining the tight tolerances and holding the exact shapes. A lost glass or lost plastic process is optionally used to create the exact desired shape, as shown in FIG. 25a and 25b. In this example, an etchable or dissolvable material 95 is added to the preform before the fiber draw, to maintain the thin narrow vertical ribs 90 and hold the top of the plasma channel 35 as flat as possible. FIGS. 25a and 25b also show a contoured glass membrane 39 around the plasma address electrodes 36. This contoured membrane 39 creates a more uniform field upon addressing, and creates a larger surface area for free carrier annihilation after plasma discharge.

Figure 26A:
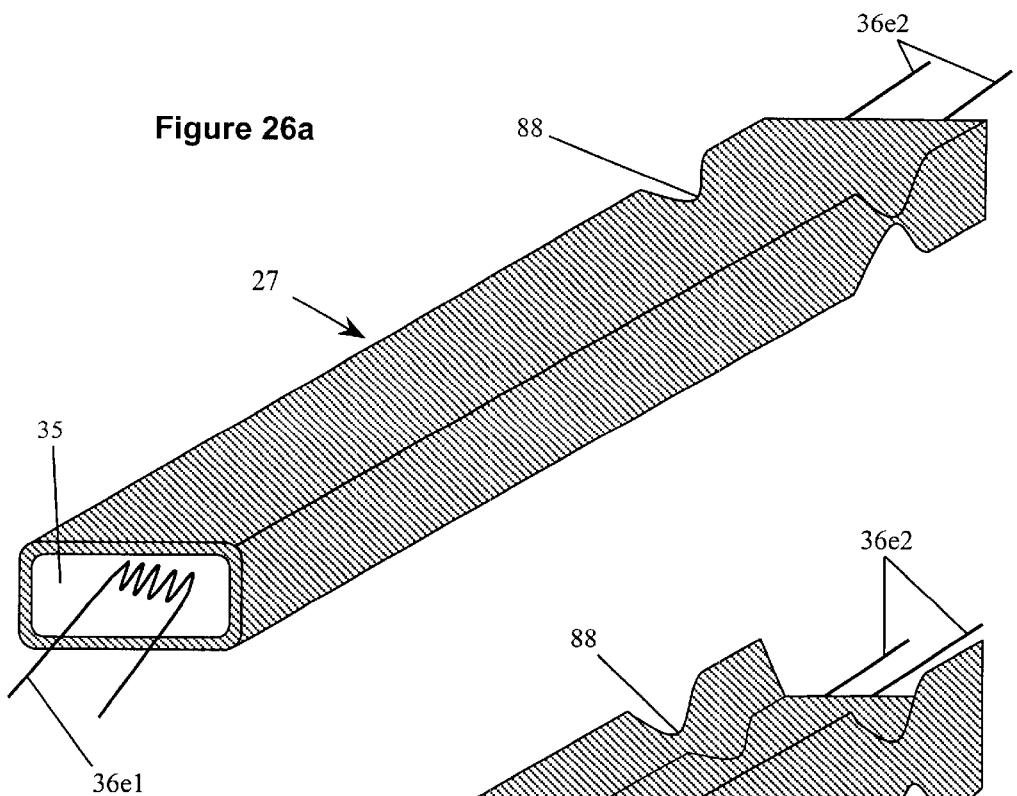
FIG. 26a schematically shows a plasma tube with the electrodes at the ends of the tubes.
Figure 26B:
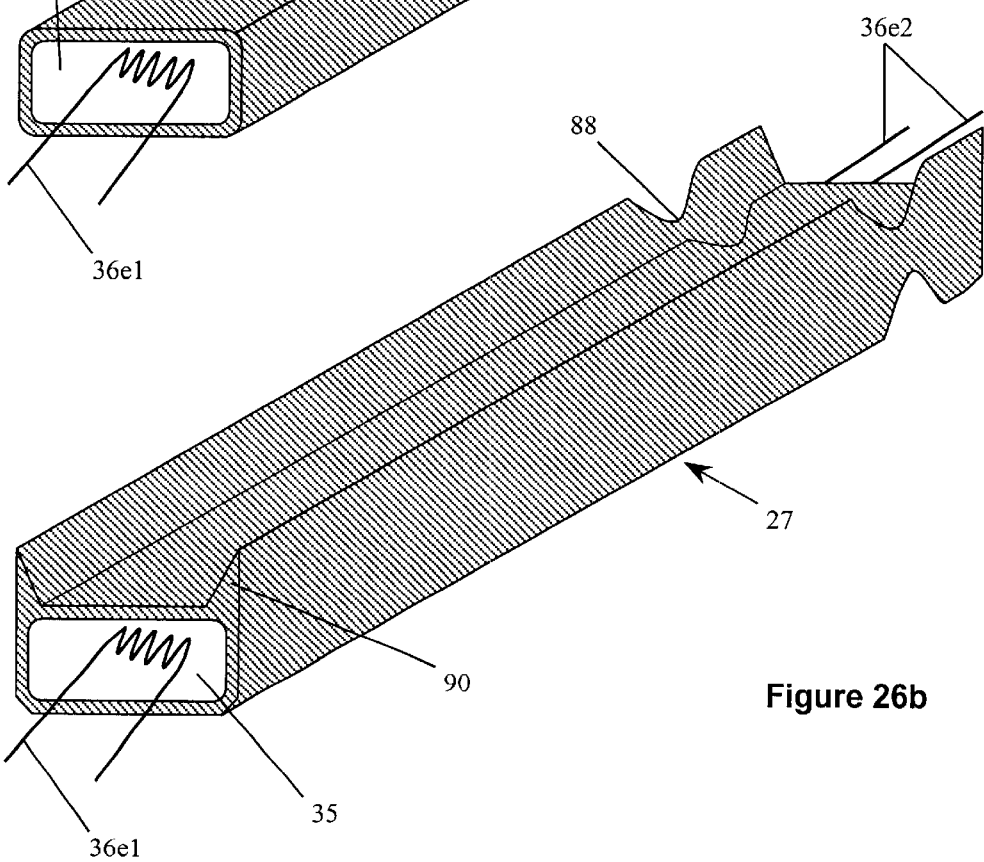
FIG. 26b schematically shows a plasma tube with built in spacers for the electro-optic material and electrodes at the ends of the tubes.

FIG. 26 shows that the plasma within the tubes could be ignited using electrodes 36e1 and 36e2 at the ends of the tubes 27. In this case, the drawn-in wire electrodes are replaced with two electrodes at each end of the plasma tube. Electrodes 36e1 and 36e2 at the ends of the plasma tubes will only be useful in larger tubes since the firing voltage will be too high in small tubes as a result of wall quenching of the ionized gas. The tubes can be sealed at the ends by using a glass sealing frit or by locally heating the tube while the inside is at a lower pressure, hence collapsing the tube 88 onto itself and sealing it off. The ribs 90 to support the electro-optic material could also be designed into the tubes and electrodes 36 sealed into the ends, as shown in FIG. 26b.

As is obvious from the above examples there are several different methods of using fibers with wire electrodes to form a reflective display. The above figures are only used as an example and are not intended to limit the scope of using wire in fiber for reflective displays.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A reflective display comprising:
   a) a reflective electro-optic material that can be electrically addressed;
   b) at least one fiber to form structure within said reflective display; and
   c) at least one wire electrode located within said fiber to address said electro-optic material.

2. The reflective display of claim 1, wherein at least a portion of a surface of said at least one fiber comprises a channel to support said electro-optic material.

3. The reflective display of claim 1, wherein a plasma is used to assist in addressing said electro-optic material.

4. The reflective display of claim 3, wherein said at least one fiber contains a plasma tube to assist in addressing said electro-optic material.

5. The reflective display of claim 1, wherein said display also functions in a transmissive mode.

6. The reflective display of claim 1, wherein said electro-optic material is bistable.

7. The reflective display of claim 1, wherein said electro-optic material comprises a liquid crystal material.

8. The reflective display of claim 1, wherein said electro-optic material comprises an electrophoretic material.

9. The reflective display of claim 1, wherein said electro-optic material comprises an electrochromic material.

10. The reflective display of claim 1, wherein said electro-optic material comprises a bichromal sphere material.

11. The reflective display of claim 10, comprising rotating a bichromal sphere to a specified angle relative to a field supplied by said at least one electrode.

12. The reflective display of claim 1, wherein said at least one fiber is composed of an inorganic material.

13. The reflective display of claim 1, wherein said at least one fiber is composed of a polymeric material.

14. The reflective display of claim 1, wherein said at least one top fiber contains a colored material to impart color to said reflective display.

15. The reflective display of claim 14, wherein said at least one top fiber is partially composed of said colored material.

16. The reflective display of claim 14, wherein said colored material is coated on at least a portion of a surface of said at least one top fiber.

17. The reflective display of claim 1, wherein a colored pigment is added to said electro-optic display to impart color to said reflective display.

18. The reflective display of claim 1, wherein a said at least one top fiber is absorbing to increase contrast of said reflective display.

19. The reflective display of claim 1, wherein said at least one top fiber contains an absorbing material to serve as a black matrix.

20. The reflective display of claim 19, wherein said absorbing material is contained within said at least one top fiber.

21. The reflective display of claim 19, wherein said absorbing material is coated on at least a portion of a surface of said at least one top fiber.

22. The reflective display of claim 1, wherein at least a portion of said at least one fiber is composed of a reflective material to assist in the reflectivity of said reflective display.

23. The reflective display of claim 1, wherein at least a portion of a surface of said at least one fiber is contoured to affect an electric field from said at least one wire electrode.

24. The reflective display of claim 1, wherein said wire electrode is composed of a metal.

25. The reflective display of claim 1, wherein said wire electrode is composed of a carbon-based material.

26. The reflective display of claim 1, wherein said at least one fiber is curved to fabricate a curved reflective display.

27. The reflective display of claim 1, wherein said at least one fiber contains a conductive material on a surface of said at least one fiber.

28. The reflective display of claim 27, wherein said conductive material is electronically connected to a wire electrode in said at least one fiber.

29. The reflective display of claim 1, wherein said at least one fiber is placed against at least one plate to form said reflective display.

30. The reflective display of claim 29, wherein said at least one said plate contains at least one electrode to assist in addressing said reflective display.

31. The reflective display of claim 29, wherein at least one said plate is composed of glass.

32. The reflective display of claim 29, wherein at least one said plate is composed of plastic.

33. The reflective display of claim 29, wherein a polymer material is placed between said at least one top fiber and said at least one plate, said at least one plate located closest to a person viewing said display, to reduce the reflection at that interface.

34. The reflective display of claim 1, wherein said at least one fiber is sandwiched between two plates to form said reflective display.

35. The reflective display of claim 1, wherein said electro-optic material is contained within said at least one fiber.

36. The reflective display of claim 1, wherein a surface of said at least one fiber is curved to alter the reflection of incident light on said display.

37. The reflective display of claim 36, wherein said reflective display is a 3-D display.

38. The reflective display of claim 36, wherein said reflective display is a multiple view display.

39. The reflective display of claim 1, wherein said at least one fiber forms a tube with electrodes at the ends of said tube to ignite a plasma in said tube.

40. A reflective fiber-based display device having a plurality of subpixels, comprising:
   a) an electro-optic material;
   b) top and bottom fiber arrays that sandwich around said electro-optic material, said top and bottom fiber arrays being substantially orthogonal and defining a structure of said display, said top fiber array disposed on a side facing towards a viewer;
   c) a top and bottom plate that sandwich around said top and bottom fiber arrays;
   d) wire electrodes within said top fiber array located near a surface of said top fiber array on a side facing away from said viewer such that said wire electrodes within said top fiber array can be used to modulate said electro-optic material;
   e) plasma channels within said bottom fiber array such that a plasma can be created within said plasma channels;
   f) wire electrodes within said bottom fiber array such that said wire electrodes within said bottom fiber array can be used to address a plasma in said plasma channels such that said plasma in said plasma channels is used to address said electro-optic material; and
   g) a drive control system connected to said wire electrodes in said top fiber array and said wire electrodes in said bottom fiber array.

41. A transflective display comprising:
   a) an electro-optic bichromal sphere material that can be electrically addressed;
   b) at least one fiber to form structure within said transflective display; and
   c) at least one wire electrode within said fiber to address said bichromal sphere electro-optic material.

42. The transflective display of claim 41, wherein said electro-optic material reflects light when addressed.

43. The transflective display of claim 41, wherein said electro-optic material absorbs light when addressed.

44. A fiber-based display having a plurality of subpixels, comprising:
   a) an electro-optic material composed of a plurality of spheres that can be rotated using an electric field to alter a visible appearance of said electro-optic material;
   b) a top fiber array and a bottom hollow tube array sandwiched around said electro-optic material, said top array and said bottom array being substantially orthogonal and defining a structure of said display, said top fiber array disposed on a side facing towards a viewer;
   wherein said top fiber array comprises:
      i) a plurality of top fibers; and
      ii) a plurality of wire electrodes within said top fibers, wherein said wire by electrodes are located near a surface of said top fibers on a side facing away from said viewer such that said wire electrodes within said top fiber array can be used to create an electric field to modulate said electro-optic material; and
   wherein said bottom hollow tube array comprises:
      i) a plurality of hollow tubes within said bottom hollow tube array formed such that a plasma can be created within said hollow tubes; and
      ii) a plurality of wire electrodes such that said wire electrodes can be used to address a plasma in said hollow tubes such that said plasma is used to create a charge that creates an electric field to address said electro-optic material;
   c) a top plate and a bottom plate sandwiched around said top array and said bottom array; and
   d) a drive control system connected to said wire electrodes in said top fiber array and said wire electrodes in said bottom fiber array.

45. A fiber-based display of claim 44, wherein a gray scale is achieved by controlling a magnitude of a voltage applied to the wire electrodes in said top fiber array.

46. A fiber-based display of claim 44, wherein a gray scale is achieved by controlling an amount of time that said charge created by the plasma is plated out on at least one inside wall of the hollow tubes.

47. A fiber-based display of claim 44, wherein a gray scale is achieved by dividing an image pixel intensity up between more than one subpixel.

48. An electronic display comprising:
   a) at least one fiber to form structure within said display;
   b) an electro-optic material composed of spheres that can be rotated using an electric field to alter the visible appearance of said electro-optic material; and
   c) at least one wire electrode within said fiber used to create said electric field.

* * * * *

UNITED STATES PATENT AND TRADEMARK OFFICE
CERTIFICATE OF CORRECTION

PATENT NO. : 6,459,200 B1  
DATED : October 15, 2002  
INVENTOR(S) : Chad Byron Moore It is certified that error appears in the above-identified patent and that said Letters Patent is hereby corrected as shown below:

<u>Title page,</u>  
Item [63], replace with the following Related U.S. Application Data,  
-- This is a continuation-in-part of application No. 09/299,372, filed on April 26, 1999, now Pat. No. 6,452,332. --

Signed and Sealed this

Fourth Day of February, 2003

JAMES E. ROGAN  
*Director of the United States Patent and Trademark Office*